United States Patent [19]
Chang et al.

[11] Patent Number: 5,455,834
[45] Date of Patent: Oct. 3, 1995

[54] FAULT TOLERANT ADDRESS TRANSLATION METHOD AND SYSTEM

[75] Inventors: Chih-Wei D. Chang; Nirmal Saxena, both of San Jose, Calif.

[73] Assignee: HaL Computer Systems, Inc., Campbell, Calif.

[21] Appl. No.: 76,396

[22] Filed: Jun. 14, 1993

[51] Int. Cl.⁶ .................................................. H03M 13/00
[52] U.S. Cl. ..................................... 371/40.1; 395/182.03
[58] Field of Search .................................. 371/40.1–40.4, 371/51.1, 55, 2.1, 21.6, 32, 7–14; 395/400, 425, 575; 365/49

[56] References Cited

U.S. PATENT DOCUMENTS

| | | | |
|---|---|---|---|
| 4,896,257 | 1/1990 | Ikeda et al. | 364/200 |
| 4,920,477 | 4/1990 | Colwell et al. | 395/425 |
| 5,173,905 | 12/1992 | Parkinson et al. | 371/40.1 |
| 5,226,043 | 7/1993 | Pughe, Jr. et al. | 371/40.1 |
| 5,233,610 | 8/1993 | Nakayama et al. | 371/40.1 |
| 5,265,227 | 11/1993 | Kohn et al. | 395/400 |
| 5,267,190 | 11/1993 | Easley et al. | 365/49 |

*Primary Examiner*—James P. Trammell
*Attorney, Agent, or Firm*—Phong K. Truong; Fenwick & West

[57] ABSTRACT

A method and system are disclosed wherein error detection codes are used for detecting and handling hardware errors in a memory table. Before each address and associated data are entered into the memory table, an error detection code is generated for both the address and the data. The address, data, and corresponding error codes are stored in the same entry line in the memory table. When the table receives an input address from a CPU, the input address is compared to all of the addresses stored within the memory table. If any stored address matches the input address, the matched address is outputted along with its associated data and its corresponding error codes. The matched address and its associated data are each processed with its corresponding error code to determine whether the outputted address and data are identical to the address and data used to generate the error codes. If either the address or the data has been altered by a hardware error in the memory, an error signal is generated to indicate that the outputted information is invalid. This error signal causes the outputted information to be ignored. The hardware error is thus detected and tolerated. The memory table also includes a fault tolerant coherence table which contains physical addresses and corresponding error codes. Each address and corresponding error code in the coherence table is periodically outputted and processed by an error processor to check for possible errors. If an address in the coherence table contains an error, the address is invalidated. By periodically monitoring the coherence table, errors are detected and reliability is improved.

26 Claims, 9 Drawing Sheets

FAULT TOLERANT ADDRESS TRANSLATION METHOD AND SYSTEM

FIELD OF THE INVENTION

This invention relates to computer memory management units and more particularly to a method and system for detecting and handling hardware defects in the address translation tables of a memory management unit.

BACKGROUND OF THE INVENTION

In complex computer systems having a plurality of microprocessors or central processing units (CPU's), it is common practice to implement a two-tiered addressing scheme comprising virtual addresses and physical addresses. Virtual addresses correspond to addresses generated by a CPU in the course of executing a program, and physical addresses correspond to addresses at which actual memory locations can be found. In order for the CPU (which uses virtual addresses) to get access to an actual memory location, some mechanism is required for mapping or translating the virtual addresses to the physical addresses. This translation is usually achieved by using Translation Data Structures (TDS) which contain the entire set of virtual-to-physical address translations. The TDS typically resides within the main memory associated with the particular CPU.

It is possible to consult the TDS each time a translation is needed but such a translation scheme is relatively slow. To improve system performance, an intermediate memory, known as a Translation Lookaside Buffer (TLB), is typically disposed between the CPU and main memory to store the most recently accessed address translations. The TLB in essence acts as an address translation cache memory. The TLB typically resides within a memory management unit (MMU) which, in addition to translating addresses, performs a variety of memory management functions for a corresponding CPU.

A TLB is typically implemented using Content Addressable Memories (CAM's) and Static RAM's (SRAM's) because of the high speed capabilities of these components. While CAM's and SRAM's are faster than most other memory components, they are made of structurally "weaker" devices, which makes them more vulnerable to transient errors than other devices such as standard logic gates. Consequently, the data stored within a TLB stand a higher chance of being corrupted by hardware defects than data in other components. Because of the higher probability of data corruption, a system utilizing a TLB needs to have some means for detecting and handling the hardware errors that may arise. Otherwise, the failure of a single cell in the TLB may cause the system to fail or, at the very least, may require that the entire MMU be replaced. Replacing the entire MMU for such a minor defect would be a waste of valuable resources. To optimize the reliability of the system and to minimize waste, a means for detecting and handling errors in the translation table of a MMU is needed.

SUMMARY OF THE INVENTION

In accordance with the present invention, a method and system are provided for detecting and handling hardware errors in a translation table, and in a memory table in general, wherein error detection codes are used to ensure accuracy. According to the method of the present invention, each time an address and an associated set of data are entered into the memory table, two error detection codes are preferably generated. The first error code, which "protects" the address, is generated using the address bits, and the second error code, which "protects" the data, is generated using the data bits. The address, associated data, and the two error codes are thereafter loaded into an entry line of the memory table and stored therein to await access.

When the memory table is accessed by a CPU, the table receives an input address from the CPU and compares this input address to all of the addresses stored in the table. If one of the stored addresses matches the input address, all of the information stored on the same entry line as the matched address is outputted, namely, the matched address, the associated set of data, and the two corresponding error detection codes. To ensure that the outputted address and data were not corrupted by a hardware error while they were stored within the memory table, the address and its corresponding error code are processed, and the data and its corresponding error code are processed. This processing step determines whether the outputted address and data are the same as the address and data used originally to generate the error codes. If either the outputted address or data has been altered, an error indication is provided, which causes the outputted address and data to be invalidated. The invalidation of the information causes the address match to be treated as a "miss", which in turn, causes the correct information to be retrieved from main memory. This correct information is used instead of the corrupted information. Thus, the hardware error is detected and tolerated.

The present invention also provides a system for implementing the above method, the system preferably comprising two code generators, a memory, and two error processors. Each of the code generators receives either an address or a set of data, and generates a corresponding error detection code. These error codes, along with their corresponding address and data, are loaded into and stored within an entry line of the memory. When the memory receives an input address from a CPU, it compares the input address to the addresses stored within itself to determine if there is a match. If a matched address is found, the memory preferably outputs the matched address, the associated set of data, and the corresponding error codes. One of the error processors receives the matched address and its corresponding error code, and the other error processor receives the data and its corresponding error code. The error processors process the received information to determine if the address and data are identical to the address and data used to generate the error codes. If either the address or data has been corrupted, an error signal is generated to indicate that the entry line contains invalid information.

The system of the present invention preferably further comprises a fault tolerant memory coherence table. Since a translation table functions much like a cache memory, it preferably includes a coherence table to ensure that data in the translation table is consistent with the copy stored in main memory. Thus, in accordance with the present invention, a fault tolerant memory coherence table is provided, comprising a code generator, a memory, a controller, and an error processor. The code generator receives a physical address and generates a corresponding error detection code for the address. The memory receives and stores the address and its corresponding error code on a single entry line. Thereafter, the controller periodically causes the memory to output information from a particular entry line to the error processor. The error processor processes the address and the error code to determine whether the address has been corrupted. If so, an error signal is generated to indicate that the address is invalid. Thus, each entry line in the coherence table is periodically monitored to detect and to handle the hardware errors which may arise.

DETAILED DESCRIPTION OF THE PREFERRED EMBODIMENTS

Figure 1:
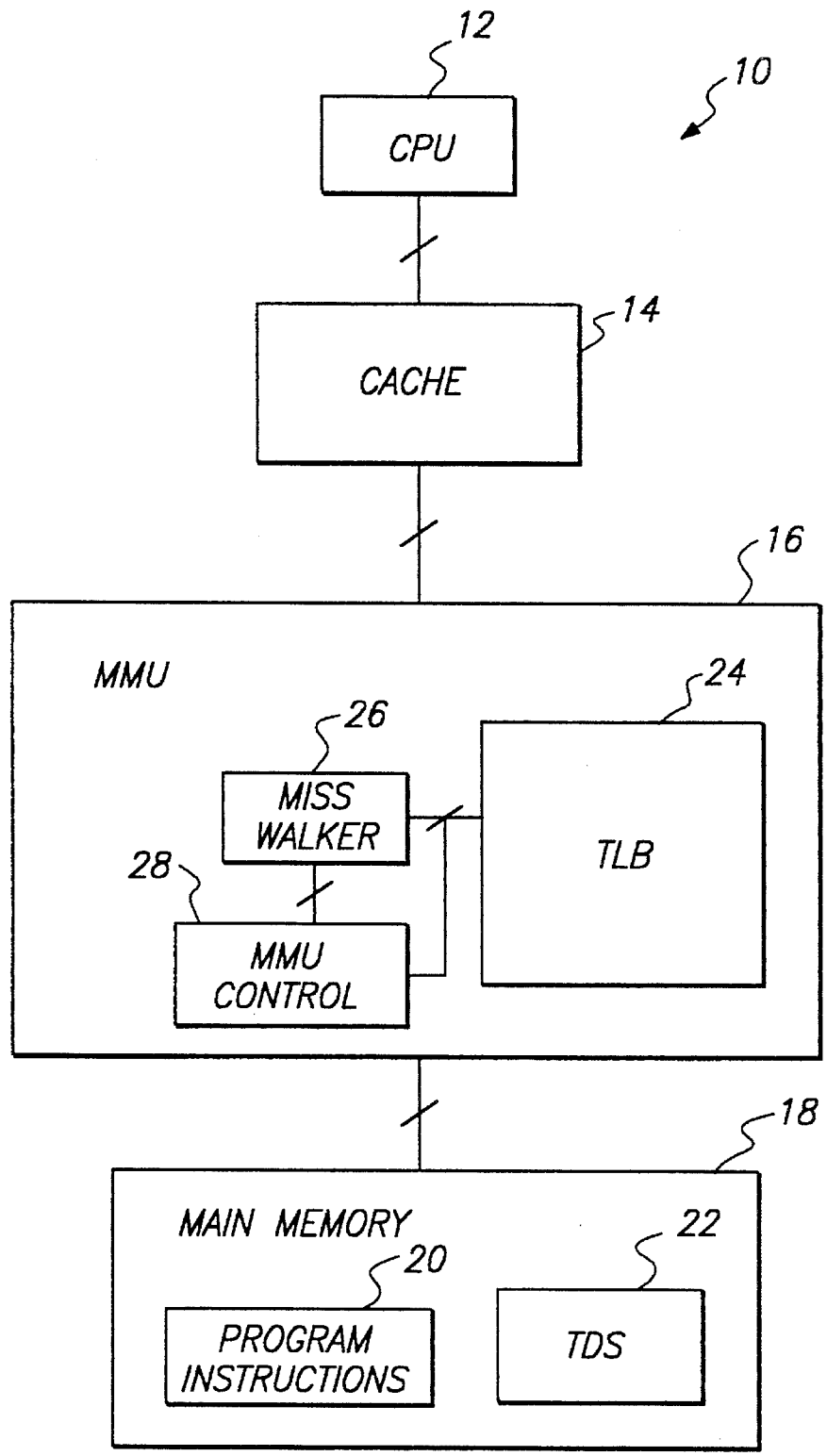
FIG. 1 is a block diagram of a computer system in which the present invention may be utilized.

The present invention is an error detecting and handling method and system which applies to memory tables in general, but which has special applicability in the address translation tables used in processor systems implementing two-tiered addressing schemes. Thus, the invention will be described with reference to address translation tables, but it should be noted that the invention is not limited to such an application. With reference to FIG. 1, there is shown a system in which the present invention may be utilized, the system 10 comprising a CPU 12, a cache memory 14, a memory management unit (MMU) 16, and a main memory 18.

In system 10, the CPU 12, which may be a SPARC V9 microprocessor manufactured by Sun Microsystems, Inc. of Mountain View, Calif., operates by accessing and executing the program instructions 20 stored within the main memory 18. In the process of executing these instructions 20, CPU 12 generates a plurality of "virtual addresses" which the CPU 12 uses and understands. These virtual addresses, however, have no direct correlation with the "physical addresses" located in the main memory 18; thus, a two-tiered addressing scheme is created including virtual addresses used by the CPU 12, and physical addresses used by the main memory 18. To map the virtual addresses to the physical addresses, and thereby, allow the CPU 12 to access physical locations within the main memory 18, there is maintained a set of Translation Data Structures (TDS) 22 within the main memory 18 which contains a complete set of virtual-to-physical address translations. The TDS 22 is used by the MMU 16 to provide the CPU 12 with the address translations that it needs. Once the CPU 12 receives the address translation from the MMU 16, it uses the translated address to access the physical location in main memory 18.

In executing programs, CPU 12 needs to access memory a great number of times to retrieve and to modify data. It is possible for CPU 12 to access main memory 18 each time it needs data, but such an implementation is relatively slow. To improve system performance, cache memory 14 is placed between CPU 12 and main memory 18 to store some of the most recently accessed data. If this data is needed again by CPU 12, it may be retrieved from the faster cache memory 14 instead of from the main memory 18. One preferred characteristic of cache memory 14 is that its entries be "virtually tagged", that is, the data entries stored within cache memory 14 are preferably referenced by virtual addresses instead of physical addresses. This allows the address translation process to be bypassed. To illustrate, when CPU 12 wishes to access memory, it outputs a specific virtual address. If the entries in cache memory 14 are tagged using virtual addresses, and if the specific virtual address is currently stored within the cache 14, then the desired data is retrieved from the cache 14 without having to translate the virtual address into a physical address. Thus, virtually tagging the cache entries saves on translation time which, in turn, improves system efficiency.

As mentioned above, it is MMU 16 which translates addresses for CPU 12 by accessing and consulting the TDS 22 in main memory 18. Accessing the main memory 18 each time an address translation is needed is slow, however. To accelerate the translation process, MMU 16 maintains a Table Lookaside Buffer (TLB) 24 which acts as a cache memory to hold the most recently requested address translations. If TLB 24 contains a requested translation, that is, if there is a "hit", the translated address is retrieved directly from TLB 24 and TDS 22 is not accessed at all. If, on the other hand, TLB 24 does not contain the requested translation (a "miss"), the miss walker 26 accesses main memory 18, retrieves the requested translation from TDS 22, and loads the translation into TLB 24 for future reference. In system 10, TLB 24 serves the important function of providing accurate address translations. If hardware errors occur within TLB 24, addresses may be mistranslated and these mistranslations may compromise system integrity. To prevent such a scenario from arising, the present invention provides a method and system for detecting and handling the hardware errors that may occur within TLB 24.

Figure 2:
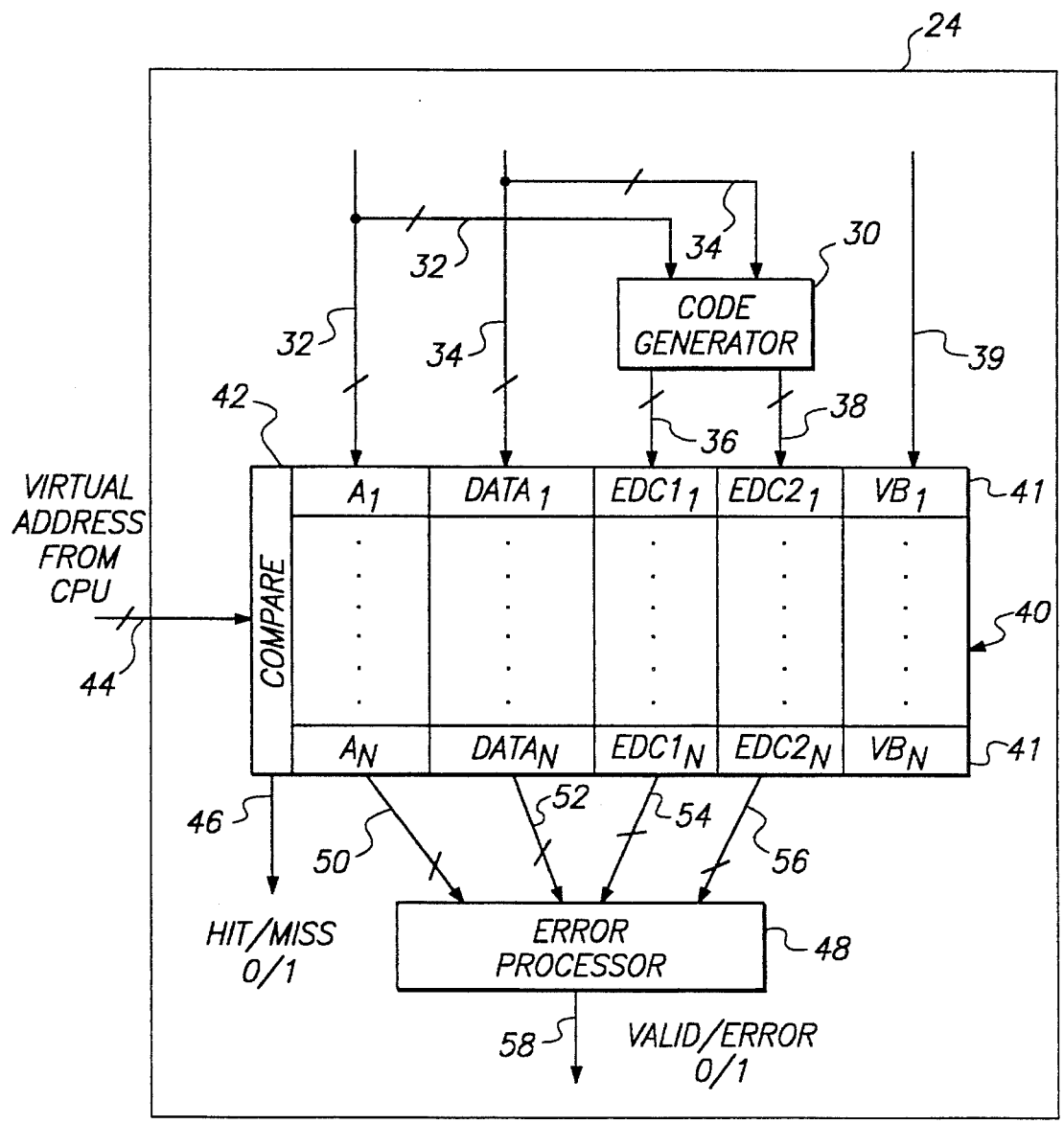
FIG. 2 is a block diagram representation of the system of the present invention.

With reference to FIG. 2, there is shown a block diagram representation of the system of the present invention. As shown in FIG. 2, the system 24 (which is also the TLB) first comprises a code generator 30 which receives a virtual address on address lines 32, and an associated physical address, which represents the translation for the virtual address, on data lines 34. Using the addresses received, code generator 30 generates two error detection codes. A first error code EDC1 is generated using the virtual address and a second error code EDC2 is generated using the physical address. Preferably, each of the error codes generated is a unique representation of the specific virtual and physical address so that each code may be deciphered along with its corresponding address at a later time to determine whether the corresponding address has been altered. This will be elaborated upon in a subsequent section. After generation, error code EDC1 is outputted onto lines 36 and error code EDC2 is outputted onto lines 38.

In addition to code generator 30, system 24 also comprises a memory 40 for receiving and storing a plurality of sets of information. Specifically, memory 40 receives a virtual address on lines 32, an associated physical address on lines 34, corresponding error codes EDC1 and EDC2 on lines 36 and 38, respectively, and a valid bit on line 39. After receiving the above information, memory 40 stores the entire set of related information into a single entry line 41. Storing the information in this manner facilitates its subsequent access since all related information may be accessed by accessing a single entry line 41. Preferably, each entry line 41 is divided into a plurality of sections, each section dedicated to storing a certain piece of information. For example, the section labeled A stores the virtual address while the EDC1 section stores the error code EDC1 corresponding to the virtual address. Separating the information in this manner makes using each piece of information much simpler. At this point, it should be noted that the section used to store the physical addresses is labeled Data instead of PA for physical address. This has been done to emphasize that the present invention is not limited to address translation tables but is applicable to all memory tables. Thus, the physical addresses will be referred to generically herein as associated data. For the memory shown in FIG. 2, there are an N number of entry lines 41; thus, memory 40 is capable of storing an N number of virtual addresses, associated physical addresses, and corresponding error codes and valid bits.

Memory 40 also comprises a compare unit 42 which receives an input virtual address from the CPU 12. Unit 42 serves to compare the input address with the addresses $A_1$–$A_N$ in the memory 40 to determine whether there is a match. If none of the addresses $A_1$–$A_N$ match the input address, compare unit 42 generates a "miss" on line 46 and no entry line information is outputted. If, on the other hand, a match is found, and if the valid bit VB corresponding to the matched address is set to "1", then compare unit 42 causes the matched address to be outputted on lines 50, its associated data to be outputted on lines 52, and the two corresponding error codes EDC1 and EDC2 to be outputted on lines 54 and 56, respectively. In effect, unit 42 causes the entry line containing the matched address to be outputted. Unit 42 also generates a "hit" on line 46 to indicate that a match has been found.

System 24 further comprises an error processor 48 for receiving and processing the information transmitted from the memory 40. Specifically, error processor 48 receives the matched address on lines 50 and its corresponding error code EDC1 on lines 54, and processes the address with the code to determine whether the outputted address is identical to the address used originally to generate the error code. If not, then it means that the address was altered by some hardware defect while stored within memory 40. This in turn means that, while an address match was found, the address match was a "false" one. Hence, the data associated with the falsely matched address should not be used. As to the associated data received on lines 52 and its corresponding error code EDC2 received on lines 56, error processor 48 performs a similar procedure. That is, the data is processed with the error code to determine whether the outputted data is identical to the data used to generate the error code. If not, then it can be concluded that the data was corrupted by a hardware error occurring within memory 40 and, hence, the data should not be used. If either the outputted address or data contains an error, error processor 48 generates an error signal on line 58 to indicate that the entry line contains an error and, thus, the outputted information is invalid.

Figure 3:
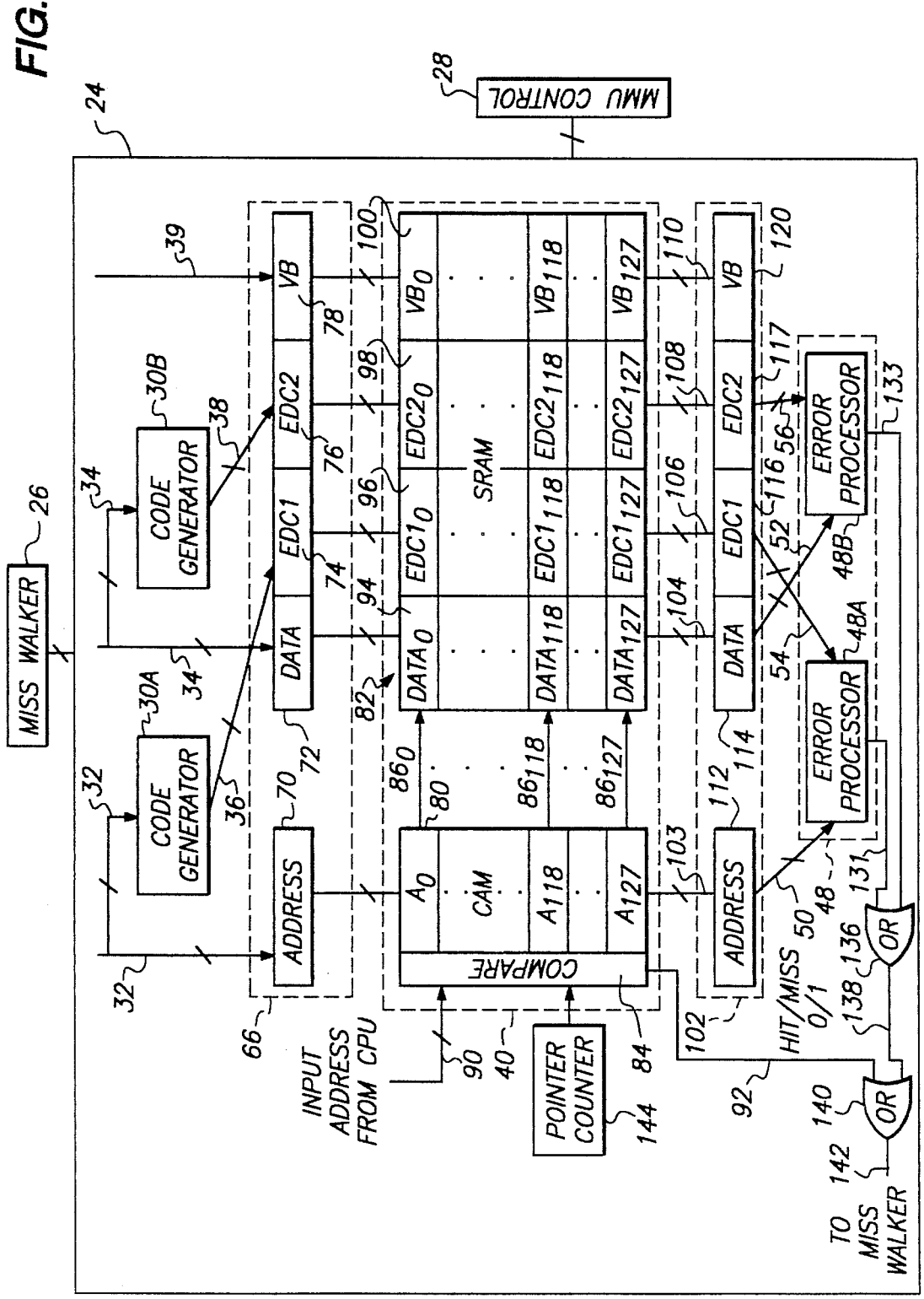
FIG. 3 is a detailed diagram of the system of the present invention.

The system 24 of FIG. 2 is shown in greater detail in FIG. 3. Also shown in FIG. 3 are miss walker 26 and MMU control 28, both of which will be discussed later. As illustrated in FIG. 3, the code generator 30 comprises two sub-generators 30A and 30B. Sub-generator 30A receives an address on lines 32 and generates an error code EDC1 using that address, and sub-generator 30B receives an associated set of data on lines 34 and generates an error code EDC2 using that data. Preferably, sub-generators 30A, 30B generate error detection codes which are known as Hamming error detection codes. Hamming coding theory is known and is described in *Error Control Coding: Fundamentals and Applications* by S. Lin and D. J. Costello, Prentice-Hall, 1983, pages 51–124, which is incorporated herein by this reference. Preferably, the Hamming codes generated by sub-generators 30A, 30B have a Hamming distance of three so that the codes may be used to detect up to two bits of error in the address and the data.

In the preferred embodiment of the present invention, each address contains 122 bits and each set of associated data contains 92 bits. In accordance with Hamming coding theory, an eight bit error code will be needed to encode each address, and a seven bit error code will be needed to encode each set of data. Thus, each address error code EDC1 will have eight bits $EDC1_0$–$EDC1_7$ and each data error code EDC2 will have seven bits $EDC2_0$–$EDC2_6$. With this information in mind, the generation of the address error code EDC1 will now be described.

Denoting the 122 address bits as A0–A121, the logic equations for generating the individual bits of the address error detection code EDC1 are given below:

$EDC1_0$ = A0 ^ A2 ^ A4 ^ A5 ^ A9 ^ A10 ^ A13
^ A14 ^ A15 ^ A22 ^ A23 ^ A24 ^ A25 ^ A26 ^ A28
^ A31 ^ A33 ^ A35 ^ A38 ^ A44 ^ A49 ^ A50 ^ A51
^ A53 ^ A54 ^ A55 ^ A56 ^ A57 ^ A58 ^ A60 ^ A61
^ A66 ^ A67 ^ A71 ^ A74 ^ A75 ^ A81 ^ A82 ^ A84
^ A88 ^ A90 ^ A93 ^ A94 ^ A96 ^ A98 ^ A103 ^ A105
^ A106 ^ A107 ^ A110 ^ A111 ^ A112 ^ A113 ^ A115 ^ A117
^ A118 ^ A119 ^ A120 ^ A121;

$EDC1_1$ = A1 ^ A3 ^ A5 ^ A6 ^ A10 ^ A11 ^ A14
^ A15 ^ A16 ^ A23 ^ A24 ^ A25 ^ A26 ^ A27 ^ A29
^ A32 ^ A34 ^ A36 ^ A39 ^ A45 ^ A50 ^ A51 ^ A52
^ A54 ^ A55 ^ A56 ^ A57 ^ A58 ^ A59 ^ A61 ^ A62
^ A67 ^ A68 ^ A72 ^ A75 ^ A76 ^ A82 ^ A83 ^ A85
^ A89 ^ A91 ^ A94 ^ A95 ^ A97 ^ A99 ^ A104 ^ A106
^ A107 ^ A108 ^ A111 ^ A112 ^ A113 ^ A114 ^ A116 ^ A118
^ A119 ^ A120 ^ A121;

$EDC1_2$ = A0 ^ A5 ^ A6 ^ A7 ^ A9 ^ A10 ^ A11
^ A12 ^ A13 ^ A14 ^ A16 ^ A17 ^ A22 ^ A23 ^ A27
^ A30 ^ A31 ^ A37 ^ A38 ^ A40 ^ A44 ^ A46 ^ A49
^ A50 ^ A52 ^ A54 ^ A59 ^ A61 ^ A62 ^ A63 ^ A66
^ A67 ^ A68 ^ A69 ^ A71 ^ A73 ^ A74 ^ A75 ^ A76
^ A77 ^ A81 ^ A82 ^ A83 ^ A86 ^ A88 ^ A92 ^ A93
^ A94 ^ A95 ^ A100 ^ A103 ^ A106 ^ A108 ^ A109 ^ A110
^ A111 ^ A114 ^ A118;

$EDC1_3$ = A0 ^ A1 ^ A2 ^ A4 ^ A5 ^ A6 ^ A7
^ A8 ^ A9 ^ A11 ^ A12 ^ A17 ^ A18 ^ A22 ^ A25
^ A26 ^ A32 ^ A33 ^ A35 ^ A39 ^ A41 ^ A44 ^ A45
^ A47 ^ A49 ^ A54 ^ A56 ^ A57 ^ A58 ^ A61 ^ A62
^ A63 ^ A64 ^ A66 ^ A68 ^ A69 ^ A70 ^ A71 ^ A72
^ A76 ^ A77 ^ A78 ^ A81 ^ A83 ^ A87 ^ A88 ^ A89
^ A90 ^ A95 ^ A98 ^ A101 ^ A103 ^ A104 ^ A105 ^ A106
^ A109 ^ A113 ^ A117 ^ A118 ^ A120 ^ A121;

$EDC1_4$ = A1 ^ A2 ^ A3 ^ A5 ^ A6 ^ A7 ^ A8
^ A9 ^ A10 ^ A12 ^ A13 ^ A18 ^ A19 ^ A23 ^ A26
^ A27 ^ A33 ^ A34 ^ A36 ^ A40 ^ A42 ^ A45 ^ A46
^ A48 ^ A50 ^ A55 ^ A57 ^ A58 ^ A59 ^ A62 ^ A63
^ A64 ^ A65 ^ A67 ^ A69 ^ A70 ^ A71 ^ A72 ^ A73
^ A77 ^ A78 ^ A79 ^ A82 ^ A84 ^ A88 ^ A89 ^ A90
^ A91 ^ A96 ^ A99 ^ A102 ^ A104 ^ A105 ^ A106 ^ A107
^ A110 ^ A114 ^ A118 ^ A119 ^ A121;

-continued $EDC1_5 = A2 \wedge A3 \wedge A4 \wedge A6 \wedge A7 \wedge A8 \wedge A9$
$\wedge A10 \wedge A11 \wedge A13 \wedge A14 \wedge A19 \wedge A20 \wedge A24 \wedge A27$
$\wedge A28 \wedge A34 \wedge A35 \wedge A37 \wedge A41 \wedge A43 \wedge A46 \wedge A47$
$\wedge A49 \wedge A51 \wedge A56 \wedge A58 \wedge A59 \wedge A60 \wedge A63 \wedge A64$
$\wedge A65 \wedge A66 \wedge A68 \wedge A70 \wedge A71 \wedge A72 \wedge A73 \wedge A74$
$\wedge A78 \wedge A79 \wedge A80 \wedge A83 \wedge A85 \wedge A89 \wedge A90 \wedge A91$
$\wedge A92 \wedge A97 \wedge A100 \wedge A103 \wedge A105 \wedge A106 \wedge A107 \wedge A108$
$\wedge A111 \wedge A115 \wedge A119 \wedge A120;$ $EDC1_6 = A0 \wedge A2 \wedge A3 \wedge A7 \wedge A8 \wedge A11 \wedge A12$
$\wedge A13 \wedge A20 \wedge A21 \wedge A22 \wedge A23 \wedge A24 \wedge A26 \wedge A29$
$\wedge A31 \wedge A33 \wedge A36 \wedge A42 \wedge A47 \wedge A48 \wedge A49 \wedge A51$
$\wedge A52 \wedge A53 \wedge A54 \wedge A55 \wedge A56 \wedge A58 \wedge A59 \wedge A64$
$\wedge A65 \wedge A69 \wedge A72 \wedge A73 \wedge A79 \wedge A80 \wedge A82 \wedge A86$
$\wedge A88 \wedge A91 \wedge A92 \wedge A94 \wedge A96 \wedge A101 \wedge A103 \wedge A104$
$\wedge A105 \wedge A108 \wedge A109 \wedge A110 \wedge A111 \wedge A113 \wedge A115 \wedge A116$
$\wedge A117 \wedge A118 \wedge A119;$ and $EDC1_7 = A1 \wedge A3 \wedge A4 \wedge A8 \wedge A9 \wedge A12 \wedge A13$
$\wedge A14 \wedge A21 \wedge A22 \wedge A23 \wedge A24 \wedge A25 \wedge A27 \wedge A30$
$\wedge A32 \wedge A34 \wedge A37 \wedge A43 \wedge A48 \wedge A49 \wedge A50 \wedge A52$
$\wedge A53 \wedge A54 \wedge A55 \wedge A56 \wedge A57 \wedge A59 \wedge A60 \wedge A65$
$\wedge A66 \wedge A70 \wedge A73 \wedge A74 \wedge A80 \wedge A81 \wedge A83 \wedge A87$
$\wedge A89 \wedge A92 \wedge A93 \wedge A95 \wedge A97 \wedge A102 \wedge A104 \wedge A105$
$\wedge A106 \wedge A109 \wedge A110 \wedge A111 \wedge A112 \wedge A114 \wedge A116 \wedge A117$
$\wedge A118 \wedge A119 \wedge A120,$ where $\wedge$ denotes an XOR operation.

The generation of these error code bits may be carded out using either software or hardware, but because software generation would require too much time, the error code bits are preferably hardware generated. From a review of the above equations, it can be seen that each error code bit is generated by simply XORing a plurality of address bits together; thus, to generate each code bit, it is possible to simply use an XOR gate having the proper number of inputs. For example, code bit $EDC1_0$ can be generated using a 59-input XOR gate. Such an implementation in not practicable, however, because an XOR gate having such a large number of inputs would be too complex and costly. Instead, each error code bit is preferably generated using a layered XOR gate structure.

Figure 4:
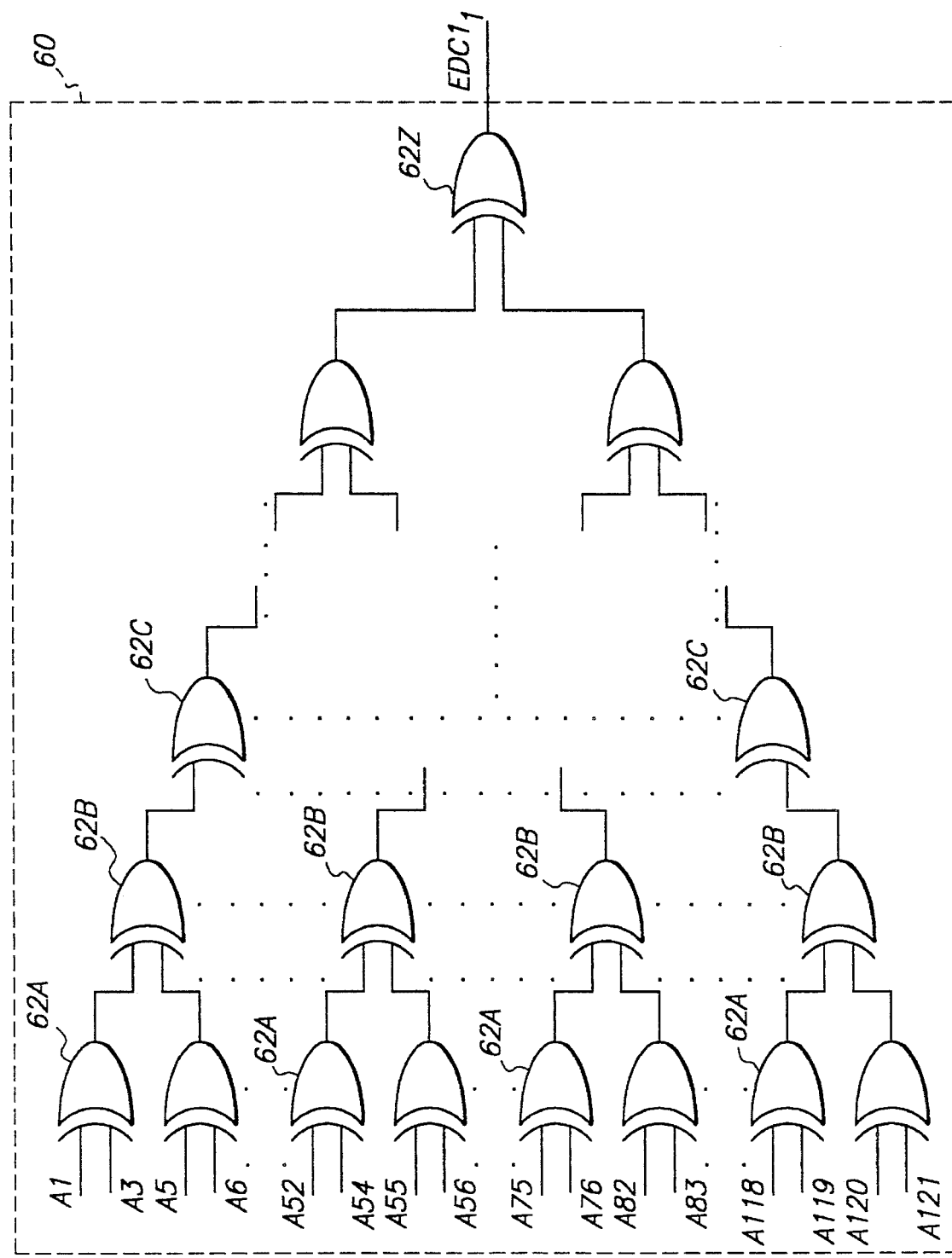
FIG. 4 is a circuit diagram of a circuit used to generate error code bit $EDC1_1$.

As an illustration, the error code bit $EDC1_1$ is preferably generated using the layered XOR circuit 60 shown in FIG. 4. From the logic equation for $EDC1_1$ given above, it is known that fifty-eight address bits must be XORed together to generate $EDC1_1$. To accommodate all of these inputs, twenty-nine two-input XOR gates 62A are provided at the lowest level of the circuit 60. As shown in FIG. 4, each of the fifty-eight address bits is inputted to one of the XOR gates 62A. Each gate 62A in the lowest layer performs an XOR operation on its two input bits and provides an output. Each of the XOR gates 62B in the next layer takes two of these outputs and XORs them together to provide a second layer output. Each of the XOR gates 62C in the next layer takes two of the second layer outputs and XORs them together to provide a third layer output. This process continues until the highest layer is reached. Since two-input gates are used, each successive layer has half the number of gates as the previous layer. The number of gates diminishes with each successive layer until, at the highest layer, there is only one gate 62Z. The output of this gate 62Z is the error code bit $EDC1_1$. $EDC1_1$ is thus generated. Since the equations for the other error code bits $EDC1_0$, $EDC1_2$–$EDC1_7$ are quite similar to that for $EDC1_1$, circuits similar to circuit 60 may be used to generate the remaining address error code bits. Code generator 30A thus comprises eight multi-layered XOR gate circuits, each circuit generating one of the eight bits of the address error code EDC1.

The data error code EDC2 is generated in a similar fashion. Denoting the associated data bits as D0–D91, the seven data error code bits $EDC2_0$–$EDC2_6$ are generated using the following equations:

$EDC2_0 = D0 \wedge D6 \wedge D7 \wedge D12 \wedge D14 \wedge D18 \wedge D19$
$\wedge D20 \wedge D21 \wedge D24 \wedge D28 \wedge D30 \wedge D31 \wedge D34 \wedge D35$
$\wedge D36 \wedge D38 \wedge D40 \wedge D43 \wedge D44 \wedge D45 \wedge D46 \wedge D47$
$\wedge D49 \wedge D54 \wedge D55 \wedge D56 \wedge D60 \wedge D63 \wedge D66 \wedge D67$
$\wedge D69 \wedge D70 \wedge D72 \wedge D74 \wedge D75 \wedge D77 \wedge D78 \wedge D79$
$\wedge D80 \wedge D82 \wedge D83 \wedge D87 \wedge D88 \wedge D90;$ $EDC2_1 = D0 \wedge D1 \wedge D6 \wedge D8 \wedge D12 \wedge D13 \wedge D14$
$\wedge D15 \wedge D18 \wedge D22 \wedge D24 \wedge D25 \wedge D28 \wedge D29 \wedge D30$
$\wedge D32 \wedge D34 \wedge D37 \wedge D38 \wedge D39 \wedge D40 \wedge D41 \wedge D43$
$\wedge D48 \wedge D49 \wedge D50 \wedge D54 \wedge D57 \wedge D60 \wedge D61 \wedge D63$
$\wedge D64 \wedge D66 \wedge D68 \wedge D69 \wedge D71 \wedge D72 \wedge D73 \wedge D74$
$\wedge D76 \wedge D77 \wedge D81 \wedge D82 \wedge D84 \wedge D87 \wedge D89 \wedge D90$
$\wedge D91;$ $EDC2_2 = D1 \wedge D2 \wedge D7 \wedge D9 \wedge D13 \wedge D14 \wedge D15$
$\wedge D16 \wedge D19 \wedge D23 \wedge D25 \wedge D26 \wedge D29 \wedge D30 \wedge D31$
$\wedge D33 \wedge D35 \wedge D38 \wedge D39 \wedge D40 \wedge D41 \wedge D42 \wedge D44$
$\wedge D49 \wedge D50 \wedge D51 \wedge D55 \wedge D58 \wedge D61 \wedge D62 \wedge D64$
$\wedge D65 \wedge D67 \wedge D69 \wedge D70 \wedge D72 \wedge D73 \wedge D74 \wedge D75$
$\wedge D77 \wedge D78 \wedge D82 \wedge D83 \wedge D85 \wedge D88 \wedge D90 \wedge D91;$ $EDC2_3 = D2 \wedge D3 \wedge D8 \wedge D10 \wedge D14 \wedge D15 \wedge D16$
$\wedge D17 \wedge D20 \wedge D24 \wedge D26 \wedge D27 \wedge D30 \wedge D31 \wedge D32$
$\wedge D34 \wedge D36 \wedge D39 \wedge D40 \wedge D41 \wedge D42 \wedge D43 \wedge D45$
$\wedge D50 \wedge D51 \wedge D52 \wedge D56 \wedge D59 \wedge D62 \wedge D63 \wedge D65$
$\wedge D66 \wedge D68 \wedge D70 \wedge D71 \wedge D73 \wedge D74 \wedge D75 \wedge D76$
$\wedge D78 \wedge D79 \wedge D83 \wedge D84 \wedge D86 \wedge D89 \wedge D91;$ $EDC2_4 = D3 \wedge D4 \wedge D9 \wedge D11 \wedge D15 \wedge D16 \wedge D17$
$\wedge D18 \wedge D21 \wedge D25 \wedge D27 \wedge D28 \wedge D31 \wedge D32 \wedge D33$
$\wedge D35 \wedge D37 \wedge D40 \wedge D41 \wedge D42 \wedge D43 \wedge D44 \wedge D46$
$\wedge D51 \wedge D52 \wedge D53 \wedge D57 \wedge D60 \wedge D63 \wedge D64 \wedge D66$
$\wedge D67 \wedge D69 \wedge D71 \wedge D72 \wedge D74 \wedge D75 \wedge D76 \wedge D77$
$\wedge D79 \wedge D80 \wedge D84 \wedge D85 \wedge D87 \wedge D90;$ $EDC2_5 = D4 \wedge D5 \wedge D10 \wedge D12 \wedge D16 \wedge D17 \wedge D18$
$\wedge D19 \wedge D22 \wedge D26 \wedge D28 \wedge D29 \wedge D32 \wedge D33 \wedge D34$
$\wedge D36 \wedge D38 \wedge D41 \wedge D42 \wedge D43 \wedge D44 \wedge D45 \wedge D47$
$\wedge D52 \wedge D53 \wedge D54 \wedge D58 \wedge D61 \wedge D64 \wedge D65 \wedge D67$
$\wedge D68 \wedge D70 \wedge D72 \wedge D73 \wedge D75 \wedge D76 \wedge D77 \wedge D78$
$\wedge D80 \wedge D81 \wedge D85 \wedge D86 \wedge D88 \wedge D91;$ and $EDC2_6 = D5 \wedge D6 \wedge D11 \wedge D13 \wedge D17 \wedge D18 \wedge D19$
$\wedge D20 \wedge D23 \wedge D27 \wedge D29 \wedge D30 \wedge D33 \wedge D34 \wedge D35$
$\wedge D37 \wedge D39 \wedge D42 \wedge D43 \wedge D44 \wedge D45 \wedge D46 \wedge D48$
$\wedge D53 \wedge D54 \wedge D55 \wedge D59 \wedge D62 \wedge D65 \wedge D66 \wedge D68$
$\wedge D69 \wedge D71 \wedge D73 \wedge D74 \wedge D76 \wedge D77 \wedge D78 \wedge D79$
$\wedge D81 \wedge D82 \wedge D86 \wedge D87 \wedge D89,$ $\wedge$ signifies an XOR operation.

Like the address error code bits, the data error code bits $EDC2_0$–$EDC2_6$ are generated using only XOR operations. Consequently, a circuit similar to circuit 60 may be used to generate each of the code bits. Hence, code generator 30B comprises seven multi-layered XOR gate circuits, each circuit generating one of the code bits $EDC2_0$–$EDC2_6$. The error codes EDC1 and EDC2 are thus generated.

While the code generator 30 has been described as generating two separate error codes, it should be noted that the present invention may be implemented by generating only one error code. That is, instead of generating separate error codes for the address and data, a single error code may be generated using both the address and the data. Whether one error code or two error codes is generated is a matter of design choice. The use of a single error code is within the scope of the present invention.

After generation, the error codes EDC1 and EDC2 are loaded into input buffer 66 (FIG. 3) via lines 36 and 38, respectively, along with the address and data used to generate the error codes. Input buffer 66 preferably is divided into a plurality of sections, each section storing a particular piece of information. Specifically, sections 70–78 store the address, the associated data, EDC1, EDC2, and the valid bit, respectively. To facilitate the loading of information into memory 40, sections 70–78 are preferably arranged such that they correspond to those same sections in memory 40. When buffer 66 is loaded with all of the necessary information, the contents of the buffer 66 are transferred into one of the entry lines in memory 40.

As shown in FIG. 3, the memory 40 preferably comprises two separate memories, a content addressable memory (CAM) 80 for storing the addresses A, and a static RAM (SRAM) 82 for storing the data, error codes EDC1, EDC2, and valid bits VB. Both memories 80, 82 preferably has the same number of entry lines so that there is a one-to-one correspondence between the entry lines of the memories. This allows for easy indexing between the memories, which in turn, enables the separate memories 80, 82 to behave as one contiguous memory. In the preferred embodiment, each memory has 128 entry lines. Memories having more or fewer entry lines may be used if so desired.

With regard to CAM 80, this memory 80 preferably comprises a compare unit 84. The function of unit 84 is to receive an input address on input lines 90 and to simultaneously compare that input address to all of the address $A_0$–$A_{127}$ stored within the CAM 80. If the input address matches one of the stored addresses, and if the valid bit VB associated with the matched address is a "1", then compare unit 84 activates the hit line 86 associated with the entry line in which the matched address is stored. For example, if address $A_{127}$ matches the input address, and if valid bit $VB_{127}$ is a "1", then the hit line $86_{127}$ is activated to indicate that a match was found on entry line 127. If no match is found, all of the hit lines 86 remain inactive. In addition to these functions, compare unit 84 also generates a hit/miss signal on line 92. When a valid match is found (i.e. a matched address is found and the valid bit associated with the matched address is set to "1"), unit 84 sets line 92 to a logic low. If there is a "miss", line 92 is set to a logic high. Memories such as CAM 80 are commercially available; thus, the structure of CAM 80 will not be described in detail herein.

As mentioned above, SRAM 82 has a plurality of entry lines. Each entry line is preferably divided into four sections as shown in FIG. 3 with a section 94 for storing the data, a section 96 for storing EDC1, a section 98 for storing EDC2, and a section 100 for storing the valid bit. Each entry line in SRAM 82 is coupled to one of the hit lines 86 from CAM 80 and is accessed by activating the corresponding hit line. For example, SRAM entry line 127 is accessed by activating hit line $86_{127}$. Connected to the CAM 80 in this manner, the SRAM 82 will only be accessed if a match is found in the CAM 80. Otherwise, no information is outputted from the SRAM 82 and no error processing is performed. Such an arrangement is efficient because the SRAM 82 is accessed only when it is necessary. This minimizes the power dissipated by the system 24.

In the case that a valid match is found, the matched address, associated data, corresponding error codes, and valid bit are loaded into output buffer 102 via lines 103, 104, 106, 108, and 110, respectively. Like input buffer 66, output buffer 102 is preferably divided into a plurality of sections which correspond to the sections in memory. Specifically, section 112 receives the address, section 114 holds the data, section 116 receives EDC1, section 117 holds EDC2, and section 120 holds the valid bit. The information stored in buffer 102 is used by error processor 48 in determining whether an error has occurred.

Figure 5:
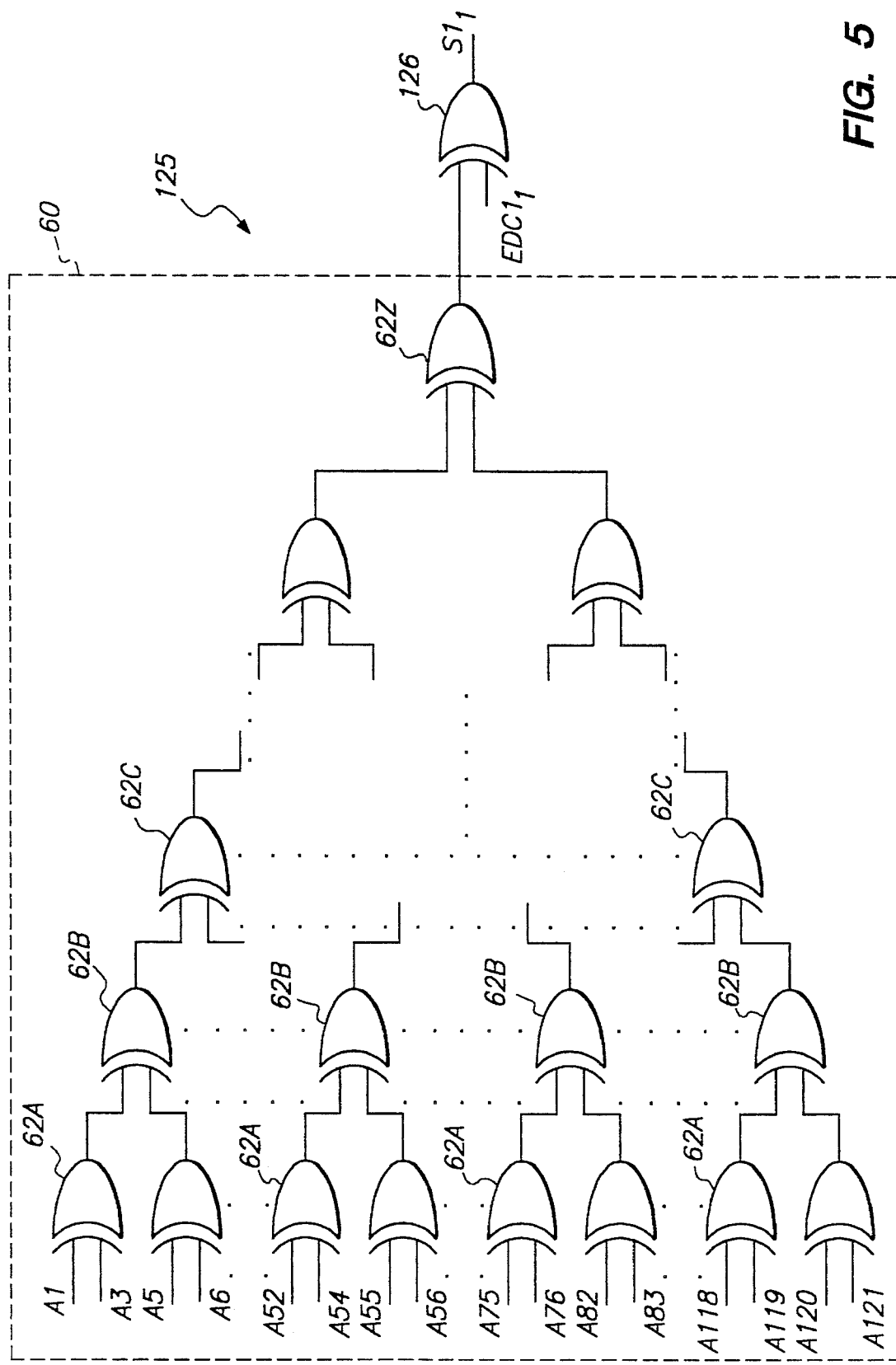
FIG. 5 is a circuit diagram of a circuit used to generate syndrome code bit $S1_1$.

As shown in FIG. 3, error processor 48 preferably comprises two separate sub-processors, sub-processor 48A for processing the address and its corresponding error code EDC1, and sub-processor 48B for processing the data and its corresponding error code EDC2. Sub-processor 48A will be described first. Sub-processor 48A receives the address via lines 50 and the error code EDC1 via lines 54, and uses the address and error code to generate an eight bit $S1_0$–$S1_7$ syndrome code. If all eight syndrome code bits $S1_0$–$S1_7$ are zero, then the outputted address is identical to the address used originally to generate the error code EDC1, which means the address is valid. Otherwise, the outputted address contains an error. The eight syndrome bits $S1_0$–$S1_7$ are generated using the following logic equations:

$S1_0 = EDC1_0 \wedge A0 \wedge A2 \wedge A4 \wedge A5 \wedge A9 \wedge A10 \wedge A13$
$\wedge A14 \wedge A15 \wedge A22 \wedge A23 \wedge A24 \wedge A25 \wedge A26 \wedge A28$
$\wedge A31 \wedge A33 \wedge A35 \wedge A38 \wedge A44 \wedge A49 \wedge A50 \wedge A51$
$\wedge A53 \wedge A54 \wedge A55 \wedge A56 \wedge A57 \wedge A58 \wedge A60 \wedge A61$
$\wedge A66 \wedge A67 \wedge A71 \wedge A74 \wedge A75 \wedge A81 \wedge A82 \wedge A84$
$\wedge A88 \wedge A90 \wedge A93 \wedge A94 \wedge A96 \wedge A98 \wedge A103 \wedge A105$
$\wedge A106 \wedge A107 \wedge A110 \wedge A111 \wedge A112 \wedge A113 \wedge A115 \wedge A117$
$\wedge A118 \wedge A119 \wedge A120 \wedge A121;$ $S1_1 = EDC1_1 \wedge A1 \wedge A3 \wedge A5 \wedge A6 \wedge A10 \wedge A11 \wedge A14$
$\wedge A15 \wedge A16 \wedge A23 \wedge A24 \wedge A25 \wedge A26 \wedge A27 \wedge A29$
$\wedge A32 \wedge A34 \wedge A36 \wedge A39 \wedge A45 \wedge A50 \wedge A51 \wedge A52$
$\wedge A54 \wedge A55 \wedge A56 \wedge A57 \wedge A58 \wedge A59 \wedge A61 \wedge A62$
$\wedge A67 \wedge A68 \wedge A72 \wedge A75 \wedge A76 \wedge A82 \wedge A83 \wedge A85$
$\wedge A89 \wedge A91 \wedge A94 \wedge A95 \wedge A97 \wedge A99 \wedge A104 \wedge A106$
$\wedge A107 \wedge A108 \wedge A111 \wedge A112 \wedge A113 \wedge A114 \wedge A116 \wedge A118$
$\wedge A119 \wedge A120 \wedge A121;$ $S1_2 = EDC1_2 \wedge A0 \wedge A5 \wedge A6 \wedge A7 \wedge A9 \wedge A10 \wedge A11$
$\wedge A12 \wedge A13 \wedge A14 \wedge A16 \wedge A17 \wedge A22 \wedge A23 \wedge A27$
$\wedge A30 \wedge A31 \wedge A37 \wedge A38 \wedge A40 \wedge A44 \wedge A46 \wedge A49$
$\wedge A50 \wedge A52 \wedge A54 \wedge A59 \wedge A61 \wedge A62 \wedge A63 \wedge A66$
$\wedge A67 \wedge A68 \wedge A69 \wedge A71 \wedge A73 \wedge A74 \wedge A75 \wedge A76$
$\wedge A77 \wedge A81 \wedge A82 \wedge A83 \wedge A86 \wedge A88 \wedge A92 \wedge A93$
$\wedge A94 \wedge A95 \wedge A100 \wedge A103 \wedge A106 \wedge A108 \wedge A109 \wedge A110$
$\wedge A111 \wedge A114 \wedge A118;$ $S1_3 = EDC1_3 \wedge A0 \wedge A1 \wedge A2 \wedge A4 \wedge A5 \wedge A6 \wedge A7$
$\wedge A8 \wedge A9 \wedge A11 \wedge A12 \wedge A17 \wedge A18 \wedge A22 \wedge A25$
$\wedge A26 \wedge A32 \wedge A33 \wedge A35 \wedge A39 \wedge A41 \wedge A44 \wedge A45$
$\wedge A47 \wedge A49 \wedge A54 \wedge A56 \wedge A57 \wedge A58 \wedge A61 \wedge A62$
$\wedge A63 \wedge A64 \wedge A66 \wedge A68 \wedge A69 \wedge A70 \wedge A71 \wedge A72$
$\wedge A76 \wedge A77 \wedge A78 \wedge A81 \wedge A83 \wedge A87 \wedge A88 \wedge A89$
$\wedge A90 \wedge A95 \wedge A98 \wedge A101 \wedge A103 \wedge A104 \wedge A105 \wedge A106$
$\wedge A109 \wedge A113 \wedge A117 \wedge A118 \wedge A120 \wedge A121;$ $S1_4 = EDC1_4 \wedge A1 \wedge A2 \wedge A3 \wedge A5 \wedge A6 \wedge A7 \wedge A8$
$\wedge A9 \wedge A10 \wedge A12 \wedge A13 \wedge A18 \wedge A19 \wedge A23 \wedge A26$
$\wedge A27 \wedge A33 \wedge A34 \wedge A36 \wedge A40 \wedge A42 \wedge A45 \wedge A46$
$\wedge A48 \wedge A50 \wedge A55 \wedge A57 \wedge A58 \wedge A59 \wedge A62 \wedge A63$
$\wedge A64 \wedge A65 \wedge A67 \wedge A69 \wedge A70 \wedge A71 \wedge A72 \wedge A73$
$\wedge A77 \wedge A78 \wedge A79 \wedge A82 \wedge A84 \wedge A88 \wedge A89 \wedge A90$
$\wedge A91 \wedge A96 \wedge A99 \wedge A102 \wedge A104 \wedge A105 \wedge A106 \wedge A107$
$\wedge A110 \wedge A114 \wedge A118 \wedge A119 \wedge A121;$ $S1_5 = EDC1_5 \wedge A2 \wedge A3 \wedge A4 \wedge A6 \wedge A7 \wedge A8 \wedge A9$
$\wedge A10 \wedge A11 \wedge A13 \wedge A14 \wedge A19 \wedge A20 \wedge A24 \wedge A27$
$\wedge A28 \wedge A34 \wedge A35 \wedge A37 \wedge A41 \wedge A43 \wedge A46 \wedge A47$
$\wedge A49 \wedge A51 \wedge A56 \wedge A58 \wedge A59 \wedge A60 \wedge A63 \wedge A64$
$\wedge A65 \wedge A66 \wedge A68 \wedge A70 \wedge A71 \wedge A72 \wedge A73 \wedge A74$
$\wedge A78 \wedge A79 \wedge A80 \wedge A83 \wedge A85 \wedge A89 \wedge A90 \wedge A91$
$\wedge A92 \wedge A97 \wedge A100 \wedge A103 \wedge A105 \wedge A106 \wedge A107 \wedge A108$
$\wedge A111 \wedge A115 \wedge A119 \wedge A120;$ $S1_6 = EDC1_6 \wedge A0 \wedge A2 \wedge A3 \wedge A7 \wedge A8 \wedge A11 \wedge A12$
$\wedge A13 \wedge A20 \wedge A21 \wedge A22 \wedge A23 \wedge A24 \wedge A26 \wedge A29$
$\wedge A31 \wedge A33 \wedge A36 \wedge A42 \wedge A47 \wedge A48 \wedge A49 \wedge A51$
$\wedge A52 \wedge A53 \wedge A54 \wedge A55 \wedge A56 \wedge A58 \wedge A59 \wedge A64$
$\wedge A65 \wedge A69 \wedge A72 \wedge A73 \wedge A79 \wedge A80 \wedge A82 \wedge A86$
$\wedge A88 \wedge A91 \wedge A92 \wedge A94 \wedge A96 \wedge A101 \wedge A103 \wedge A104$
$\wedge A105 \wedge A108 \wedge A109 \wedge A110 \wedge A111 \wedge A113 \wedge A115 \wedge A116$
$\wedge A117 \wedge A118 \wedge A119;$ $S1_7 = EDC1_7 \wedge A1 \wedge A3 \wedge A4 \wedge A8 \wedge A9 \wedge A12 \wedge A13$
$\wedge A14 \wedge A21 \wedge A22 \wedge A23 \wedge A24 \wedge A25 \wedge A27 \wedge A30$ -continued
$$\char`^ A32 \char`^ A34 \char`^ A37 \char`^ A43 \char`^ A48 \char`^ A49 \char`^ A50 \char`^ A52$$
$$\char`^ A53 \char`^ A54 \char`^ A55 \char`^ A56 \char`^ A57 \char`^ A59 \char`^ A60 \char`^ A65$$
$$\char`^ A66 \char`^ A70 \char`^ A73 \char`^ A74 \char`^ A80 \char`^ A81 \char`^ A83 \char`^ A87$$
$$\char`^ A89 \char`^ A92 \char`^ A93 \char`^ A95 \char`^ A97 \char`^ A102 \char`^ A104 \char`^ A105$$
$$\char`^ A106 \char`^ A109 \char`^ A110 \char`^ A111 \char`^ A112 \char`^ A114 \char`^ A116 \char`^ A117$$
$$\char`^ A118 \char`^ A119 \char`^ A120,$$

where ^ signifies an XOR operation. A comparison of these equations with those for generating the EDC1 code bits reveals an interesting point, which is that the equations are substantially the same. For example, the equation for $S1_0$ is identical to the equation for $EDC1_0$ except that $S1_0$ requires $EDC1_0$ as an additional input. All of the other inputs are the same. Likewise, the equation for $S1_1$ is identical to the equation for $EDC1_1$ except that $S1_1$ requires $EDC1_1$ as an additional input. The same is true for all of the other syndrome bits. The practical significance of this is that error processor 48A may reuse the circuitry in code generator 30A to generate the syndrome bits. The only modification necessary is the addition of one XOR gate. To illustrate, a circuit for generating syndrome bit $S1_1$ is shown in FIG. 5. Note that the only difference between circuit 125 of FIG. 5 and circuit 60 of FIG. 4 is the additional XOR gate 126 which has $EDC1_1$ as one of its inputs. All of the other components are the same. Thus, the circuitry used for generating $EDC1_1$ may be reused to generate the syndrome bit $S1_1$. The other syndrome bits may be generated by reusing the other circuitry of code generator 30A in a similar fashion. The use of identical circuit components in both the code generator 30A and the error processor 48A results in great savings in terms of the hardware needed to implement the present invention.

Figure 6:
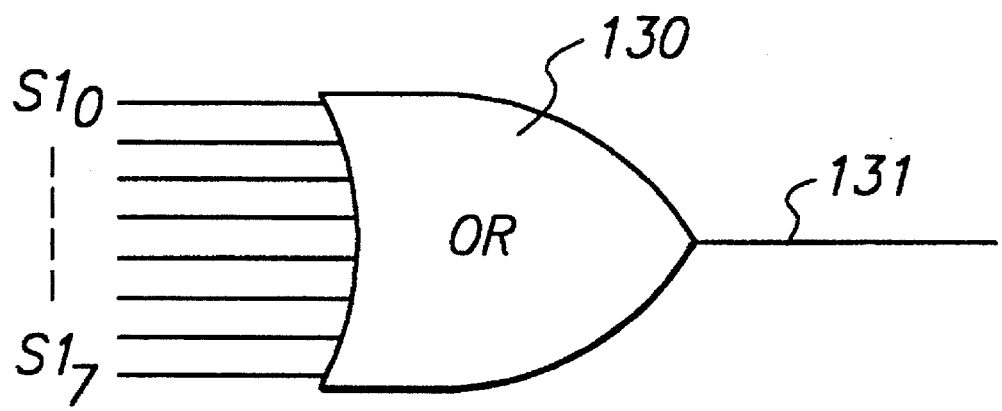
FIG. 6 shows a circuit for performing an OR operation on the eight bits $S1_0-S1_7$ of syndrome code S1.

After the syndrome code bits $S1_0$–$S1_7$ are generated, error processor 48A tests the bits to determine whether they are all zero. This may be done using an eight-input OR gate as shown in FIG. 6. If all of the syndrome bits $S1_0$–$S1_7$ are zero, then the output of OR 130 gate will be zero, thereby, indicating that no error has occurred. If any syndrome bit is a one, then OR gate 130 will output a one to indicate that the address contains an error. Error processor 48A thus checks the outputted address for errors.

Error processor 48B functions in a very similar fashion. Processor 48B receives the outputted data from lines 52 and the corresponding error code EDC2 from lines 56, and uses the data and the error code bits to generate a second syndrome code having seven bits $S2_0$–$S2_6$. The equations used to generate these syndrome bits are set forth below:

$$S2_0 = EDC2_0 \char`^ D0 \char`^ D6 \char`^ D7 \char`^ D12 \char`^ D14 \char`^ D18 \char`^ D19$$
$$\char`^ D20 \char`^ D21 \char`^ D24 \char`^ D28 \char`^ D30 \char`^ D31 \char`^ D34 \char`^ D35$$
$$\char`^ D36 \char`^ D38 \char`^ D40 \char`^ D43 \char`^ D44 \char`^ D45 \char`^ D46 \char`^ D47$$
$$\char`^ D49 \char`^ D54 \char`^ D55 \char`^ D56 \char`^ D60 \char`^ D63 \char`^ D66 \char`^ D67$$
$$\char`^ D69 \char`^ D70 \char`^ D72 \char`^ D74 \char`^ D75 \char`^ D77 \char`^ D78 \char`^ D79$$
$$\char`^ D80 \char`^ D82 \char`^ D83 \char`^ D87 \char`^ D88 \char`^ D90;$$

$$S2_1 = EDC2_1 \char`^ D0 \char`^ D1 \char`^ D6 \char`^ D8 \char`^ D12 \char`^ D13 \char`^ D14$$
$$\char`^ D15 \char`^ D18 \char`^ D22 \char`^ D24 \char`^ D25 \char`^ D28 \char`^ D29 \char`^ D30$$
$$\char`^ D32 \char`^ D34 \char`^ D37 \char`^ D38 \char`^ D39 \char`^ D40 \char`^ D41 \char`^ D43$$
$$\char`^ D48 \char`^ D49 \char`^ D50 \char`^ D54 \char`^ D57 \char`^ D60 \char`^ D61 \char`^ D63$$
$$\char`^ D64 \char`^ D66 \char`^ D68 \char`^ D69 \char`^ D71 \char`^ D72 \char`^ D73 \char`^ D74$$
$$\char`^ D76 \char`^ D77 \char`^ D81 \char`^ D82 \char`^ D84 \char`^ D87 \char`^ D89 \char`^ D90$$
$$\char`^ D91;$$

$$S2_2 = EDC2_2 \char`^ D1 \char`^ D2 \char`^ D7 \char`^ D9 \char`^ D13 \char`^ D14 \char`^ D15$$
$$\char`^ D16 \char`^ D19 \char`^ D23 \char`^ D25 \char`^ D26 \char`^ D29 \char`^ D30 \char`^ D31$$
$$\char`^ D33 \char`^ D35 \char`^ D38 \char`^ D39 \char`^ D40 \char`^ D41 \char`^ D42 \char`^ D44$$
$$\char`^ D49 \char`^ D50 \char`^ D51 \char`^ D55 \char`^ D58 \char`^ D61 \char`^ D62 \char`^ D64$$
$$\char`^ D65 \char`^ D67 \char`^ D69 \char`^ D70 \char`^ D72 \char`^ D73 \char`^ D74 \char`^ D75$$
$$\char`^ D77 \char`^ D78 \char`^ D82 \char`^ D83 \char`^ D85 \char`^ D88 \char`^ D90 \char`^ 91;$$

$$S2_3 = EDC2_3 \char`^ D2 \char`^ D3 \char`^ D8 \char`^ D10 \char`^ D14 \char`^ D15 \char`^ D16$$

Figure 7:
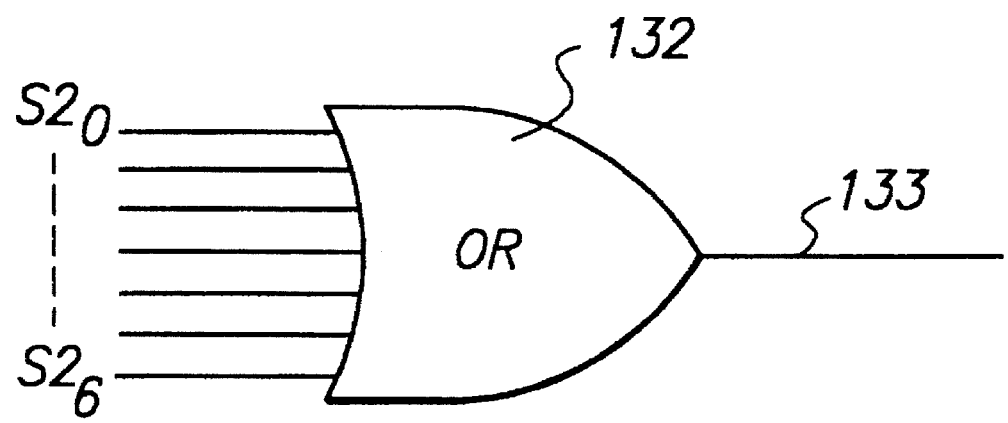
FIG. 7 shows a circuit for performing an OR operation on the seven bits $S2_0-S2_6$ of syndrome code S2.

-continued
$$\char`^ D17 \char`^ D20 \char`^ D24 \char`^ D26 \char`^ D27 \char`^ D30 \char`^ D31 \char`^ D32$$
$$\char`^ D34 \char`^ D36 \char`^ D39 \char`^ D40 \char`^ D41 \char`^ D42 \char`^ D43 \char`^ D45$$
$$\char`^ D50 \char`^ D51 \char`^ D52 \char`^ D56 \char`^ D59 \char`^ D62 \char`^ D63 \char`^ D65$$
$$\char`^ D66 \char`^ D68 \char`^ D70 \char`^ D71 \char`^ D73 \char`^ D74 \char`^ D75 \char`^ D76$$
$$\char`^ D78 \char`^ D79 \char`^ D83 \char`^ D84 \char`^ D86 \char`^ D89 \char`^ D91;$$

$$S2_4 = EDC2_4 \char`^ D3 \char`^ D4 \char`^ D9 \char`^ D11 \char`^ D15 \char`^ D16 \char`^ D17$$
$$\char`^ D18 \char`^ D21 \char`^ D25 \char`^ D27 \char`^ D28 \char`^ D31 \char`^ D32 \char`^ D33$$
$$\char`^ D35 \char`^ D37 \char`^ D40 \char`^ D41 \char`^ D42 \char`^ D43 \char`^ D44 \char`^ D46$$
$$\char`^ D51 \char`^ D52 \char`^ D53 \char`^ D57 \char`^ D60 \char`^ D63 \char`^ D64 \char`^ D66$$
$$\char`^ D67 \char`^ D69 \char`^ D71 \char`^ D72 \char`^ D74 \char`^ D75 \char`^ D76 \char`^ D77$$
$$\char`^ D79 \char`^ D80 \char`^ D84 \char`^ D85 \char`^ D87 \char`^ D90;$$

$$S2_5 = EDC2_5 \char`^ D4 \char`^ D5 \char`^ D10 \char`^ D12 \char`^ D16 \char`^ D17 \char`^ D18$$
$$\char`^ D19 \char`^ D22 \char`^ D26 \char`^ D28 \char`^ D29 \char`^ D32 \char`^ D33 \char`^ D34$$
$$\char`^ D36 \char`^ D38 \char`^ D41 \char`^ D42 \char`^ D43 \char`^ D44 \char`^ D45 \char`^ D47$$
$$\char`^ D52 \char`^ D53 \char`^ D54 \char`^ D58 \char`^ D61 \char`^ D64 \char`^ D65 \char`^ D67$$
$$\char`^ D68 \char`^ D70 \char`^ D72 \char`^ D73 \char`^ D75 \char`^ D76 \char`^ D77 \char`^ D78$$
$$\char`^ D80 \char`^ D81 \char`^ D85 \char`^ D86 \char`^ D88 \char`^ D91; \text{ and}$$

$$S2_6 = EDC2_6 \char`^ D5 \char`^ D6 \char`^ D11 \char`^ D13 \char`^ D17 \char`^ D18 \char`^ D19$$
$$\char`^ D20 \char`^ D23 \char`^ D27 \char`^ D29 \char`^ D30 \char`^ D33 \char`^ D34 \char`^ D35$$
$$\char`^ D37 \char`^ D39 \char`^ D42 \char`^ D43 \char`^ D44 \char`^ D45 \char`^ D46 \char`^ D48$$
$$\char`^ D53 \char`^ D54 \char`^ D55 \char`^ D59 \char`^ D62 \char`^ D65 \char`^ D66 \char`^ D68$$
$$\char`^ D69 \char`^ D71 \char`^ D73 \char`^ D74 \char`^ D76 \char`^ D77 \char`^ D78 \char`^ D79$$
$$\char`^ D81 \char`^ D82 \char`^ D86 \char`^ D87 \char`^ D89,$$

where ^ denotes an XOR operation. A comparison of these equations with those for generating the data error code bits $EDC2_0$–$EDC2_7$ reveals that the equations are almost identical. For instance, the equation for bit $S2_0$ is identical to the equation for bit $EDC2_0$ except that $S2_0$ requires $EDC2_0$ as an additional input. All other inputs are the same. The same is true for all of the other syndrome bits. Therefore, as was the case with processor 48A, the syndrome bits here $S2_0$–$S2_6$ are generated using equations quite similar to those used to generate the corresponding error code bits $EDC2_0$–$EDC2_7$. Thus, error processor 48B may reuse the circuitry in code generator 30B to generate the syndrome bits $S2_0$–$S2_6$. The only necessary modification is the addition of one XOR gate to take the one additional input into account. Such a modification was described above in connection with error processor 48A. Therefore, each of the syndrome bits $S2_0$–$S2_6$ is generated by reusing the circuitry in code generator 30B, and by adding one XOR gate to accommodate the one additional input. After the syndrome bits $S2_0$–$S2_6$ are generated, they are sent to the inputs of a seven-input OR gate 132 as shown FIG. 7. If all seven syndrome bits are zero, the OR gate 132 will output a zero to indicate that the data contains no error. If any syndrome bit is a one, however, then an error has occurred and the OR gate 132 will indicate that the data contains an error by providing a one at its output. Error processor 48B thus checks the outputted data for possible errors. Preferably, the output 131 of error processor 48A and the output of error processor 48B are ORed together by OR gate 136 as shown in FIG. 3 so that an error signal 138 is generated if either the outputted address or the outputted data contains an error. This ensures maximum data reliability. System 24 preferably further comprises an OR gate 140 which performs an OR operation on the hit/miss signal on line 92 and the error signal 138. The function of OR gate 140 is to output a "miss" signal (a logic one) if either there is a miss or if there is an error in the outputted address or data. The OR gate 140 in effect causes an error to be treated like a miss so that the outputted data will not be used.

Figure 8:
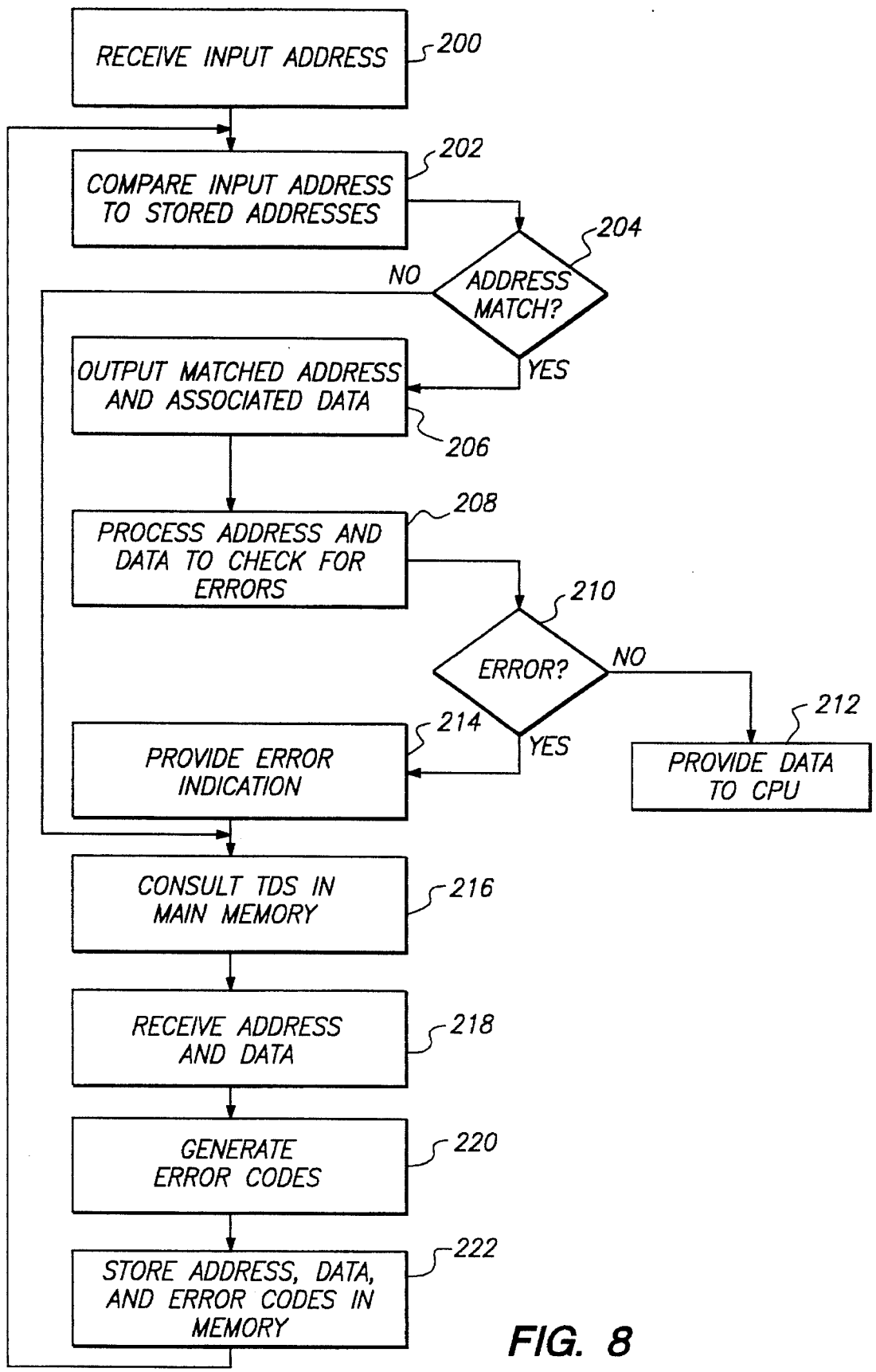
FIG. 8 is a flow diagram of the method of the present invention for detecting and handling transient errors occurring within the memory 40 of FIG. 3.

With reference to FIGS. 1, 3, and the flow chart provided in FIG. 8, the operation of system 24 will now be described. Assume for the purposes of illustration that each of the entry lines in memory 40 was previously filled with an address, associated data, corresponding error codes, and a valid bit.

System 24 begins operation by receiving 200 on lines 90 an input address from the CPU 12. This is a request from the CPU 12 for an address translation. The input address is received by CAM 80 and is simultaneously compared 202 to all of the addresses $A_1$–$A_{127}$ stored within the CAM 80.

If the input address does not match 204 any of the stored addresses, then a miss signal is sent 214 out on line 92. This miss signal causes the output 142 of OR gate 140 to be a logic one, which indicates to the miss walker 26 that no matching address was found. In response, the miss walker 26 accesses main memory 18, consults 216 TDS 22, finds an address within TDS 22 which matches the input address, and retrieves the address translation for the input address. Miss walker 26 thereafter loads the input address onto lines 32 and the address translation (associated data) onto lines 34. Miss walker 26 also generates a valid bit on line 39 to indicate that the incoming address and data are valid. Preferably, the miss walker 26 is implemented using hardware components but it may be implemented in software if so desired. Miss walkers of this type are known in the art. For example, the Motorola 88200 MMU chip manufactured by Motorola, Inc. of Schaumberg, Ill., incorporates a similar miss walker. Since the miss walker is a component which is generally known in the art, it will not be described in detail herein. For the purposes of this disclosure, it is sufficient to just understand the functions performed by the miss walker 26.

The input address loaded onto lines 32 is received 218 by code generator 30A, and the associated data on lines 34 is received 218 by code generator 30B. Generator 30A generates 220 an address error code EDC1 using the address bits, while generator 30B generates 220 a data error code EDC2 using the data bits. These error codes, along with the input address, associated data, and the valid bit are loaded into input buffer 66 and thereafter stored 222 in one of the entry lines of memory 40. Which particular entry line receives the information from buffer 66 is determined by the pointer counter 144. Counter 144 contains within it an index number which points to one of the entry lines in the memory 40. Whichever entry line is pointed to is the entry line which will receive the information from buffer 66. Each time an entry is entered into the memory 40, counter 144 is preferably incremented by one so that a first-in first-out (FIFO) replacement policy is implemented. Other replacement policies may be implemented if so desired. For illustrative purposes, assume that the information in buffer 66 is loaded into entry line 118.

With the new entry loaded into the memory 40, the input address from CPU 12 is once again compared 202 with the addresses stored in CAM 80. Unless the address in entry line 118 was corrupted by a hardware error, the CAM 80 should indicate that a matching address is found 204 on entry line 118. In response to this match, CAM 80 outputs the matched address $A_{118}$, generates a "hit" signal on line 92, and generates an activation signal on hit line $86_{118}$. The activation signal on hit line $86_{118}$ causes entry 118 of SRAM 82 to be accessed which, in turn, causes the data $Data_{118}$, error codes $EDC1_{118}$, $EDC2_{118}$, and valid bit $VB_{118}$ on entry line 118 to be outputted 206. All of the outputted information is received and stored by the output buffer 102.

It is not known at this point whether the outputted information contains errors. Thus, error processor 48A processes 208 the address $A_{118}$ and its corresponding error code $EDC1_{118}$ to check for possible errors, and error processor 48B performs the same function on the data $Data_{118}$ and its corresponding error code $EDC2_{118}$. If no errors are found 210, then the outputted data $Data_{118}$ is provided 212 to the CPU 12. However, if either the address or the data or both contain an error, then an error signal 138 is generated to provide 214 an indication that the outputted information contains an error. This error signal 138 causes a miss signal to be generated on line 142. The miss signal on line 142 causes the miss walker 26 to treat the hit as a miss and once again consult 216 the TDS 22 to bring in a new entry from main memory 18. In effect, the corrupted information is ignored. When an error is detected on an entry line, the valid bit for that entry line is reset by the MMU control 28. For example, suppose that entry line 118 has an error in its data and that this error is detected by error processor 48B. As a result, an error signal is generated on line 138. The MMU control 28 detects this error signal and responds by accessing entry line 118 in the SRAM 82 to reset the valid bit $VB_{118}$. This serves to invalidate the entry line so that it will not be used in the future. The MMU control 28 may be implemented using either software or hardware components. In the preferred embodiment, MMU control 28 is a state machine which is designed to monitor the error signal and, when an error signal is detected, to access the proper entry line in the SRAM 82 to reset the valid bit VB. By detecting and handling errors in this manner, the system 24 can tolerate any hardware error which may occur within the memory 40.

As previously stated, a TLB 24 (FIG. 1) functions as a cache memory to store a copy of the address translations most recently accessed from the TDS 22. As with all cache memories, it is important that the information stored within TLB be consistent with the same information stored within TDS 22 in the main memory 18. Otherwise, data coherency within the computer system may be compromised. In typical cache memories, data coherency is preserved by utilizing a cache coherence table. For each set of data stored within a cache, there is an identical set of data stored somewhere in the main memory. The coherence table stores the physical address in main memory at which the identical data can be found. Hence, the coherence table provides a mapping between the cache and the main memory. This mapping is used to invalidate cache entries when they become outdated, that is, when the corresponding data in the main memory is modified. Because it is desirable to ensure that the information in TLB 24 is consistent with the corresponding information in the main memory 18, TLB 24 preferably comprises a coherence table. A coherence table is only useful if its contents are accurate, however. If the physical addresses stored in the coherence table are corrupted by hardware errors, then an entry which should be invalidated may be erroneously left intact. This results in the retention of outdated and inconsistent data, which is clearly detrimental. Hence, a coherence table which is fault tolerant would be quite desirable.

Figure 9:
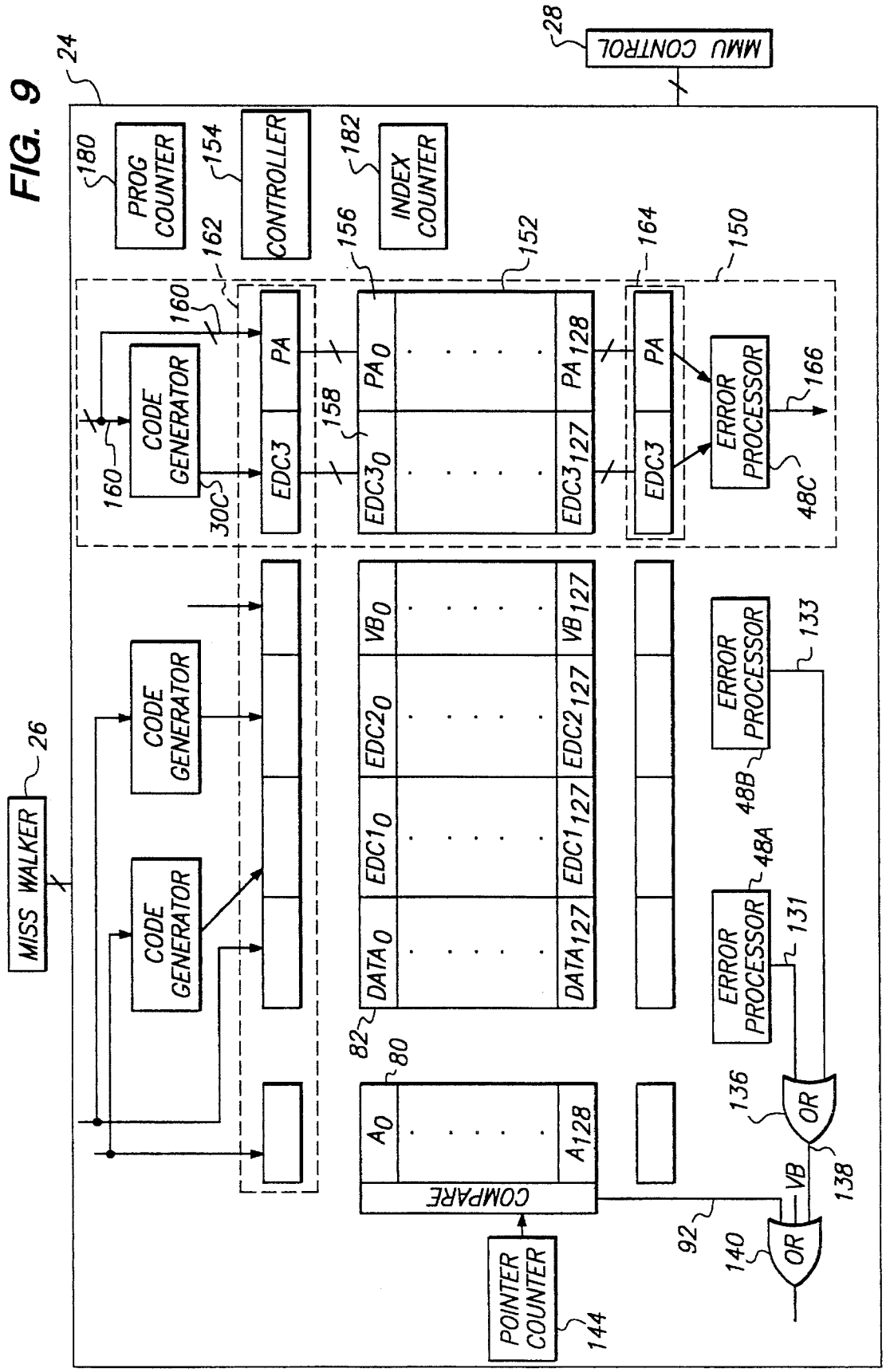
FIG. 9 is a detailed diagram of the system of the present invention further comprising a fault tolerant coherence table.

With reference to FIG. 9, there is shown the system 24 of the present invention further comprising a fault tolerant coherence table 150. The table 150 comprises a third code generator 30C, an additional memory 152, and a third error processor 48C. In addition, the system 24 further comprises a controller 154 for controlling the fault detection function of the coherence table 150. More will be said on the controller 154 in a later section.

Because table 150 is a coherence table, its function is to store within memory 152 the physical addresses in main memory where particular address translations can be found. To illustrate, suppose that a copy of the address $A_0$ and its associated data $Data_0$ is kept at physical address X within TDS 22 in main memory 18. In such a case, the entry in memory 152 (entry $PA_0$) which corresponds to this address/ data pair should have the address X stored therein. This physical address serves as a mapping between system 24 and main memory 18 so that if the contents of address X are modified, the entry line in system 24 containing the old contents of address X can be invalidated. Data coherency is thus preserved. Preferably, the memory 152 has the same number of entry lines as the two other memories 80, 82 so that there is a one-to-one correspondence among all of the memories for easy indexing. Also, each entry line in memory 152 is preferably divided into two sections, a first section 156 for storing a physical address PA, and a second section 158 for storing a corresponding error code EDC3. The memory is preferably implemented using either a CAM or an SRAM.

With regard to the code generator 30C, generator 30C receives a physical address on lines 160 at the same time that the other generators 30A, 30B receive the address and data. All of this information is provided by the miss walker 26. In response, generator 30C uses the bits of the physical address to generate a corresponding error detection code EDC3. In the preferred embodiment, each physical address comprises twenty-six bits. To encode an address of this length with a Hamming code having a Hamming distance of three, a five bit error code $EDC3_1$–$EDC3_4$ will need to be generated. Denoting the physical address bits as PA1–PA26, the equations for generating the error code bits $EDC3_1$–$EDC3_4$ are set forth below:

$EDC3_0$ = PA0 ^ PA3 ^ PA5 ^ PA6 ^ PA9 ^ PA10
^ PA11 ^ PA12 ^ PA13 ^ PA17 ^ PA18 ^ PA20
^ PA21 ^ PA22 ^ PA24;

$EDC3_1$ = PA1 ^ PA4 ^ PA6 ^ PA7 ^ PA10 ^ PA11
^ PA12 ^ PA13 ^ PA14 ^ PA18 ^ PA19 ^ PA21
^ PA22 ^ PA23 ^ PA25;

$EDC3_2$ = PA0 ^ PA2 ^ PA3 ^ PA6 ^ PA7 ^ PA8
^ PA9 ^ PA10 ^ PA14 ^ PA15 ^ PA17 ^ PA18 ^ PA19
^ PA21 ^ PA23;

$EDC3_3$ = PA1 ^ PA3 ^ PA4 ^ PA7 ^ PA8 ^ PA9
^ PA10 ^ PA11 ^ PA15 ^ PA16 ^ PA18 ^ PA19 ^ PA20
^ PA22 ^ PA24; and $EDC3_4$ = PA2 ^ PA4 ^ PA5 ^ PA8 ^ PA9 ^ PA10
^ PA11 ^ PA12 ^ PA16 ^ PA17 ^ PA19
^ PA20 ^ PA21 ^ PA23 ^ PA25, where ^ signifies an XOR operation.

As was the case with the previous error codes EDC1, EDC2, each bit of this error code EDC3 is generated using only XOR operations. This means that a multi-layered XOR gate circuit similar to the circuit 60 shown in FIG. 5 may be used to generate each bit. Hence, code generator 30C preferably comprises five multi-layered XOR gate circuits, each circuit generating one of the five error code bits $EDC3_1$–$EDC3_4$.

After error code EDC3 is generated, it is loaded into input buffer 66 along with the physical address PA. Also loaded into buffer 162 are the address, associated data, error codes, and valid bit. When input buffer 162 is fully loaded, its contents are loaded into an entry line of all three memories 80, 82, 152. The particular entry line into which the information is loaded is determined by the contents of the pointer counter 144 as previously described. Physical addresses PA and corresponding error codes EDC3 are thus stored within memory 152.

The coherence table 150 preferably further comprises an output buffer 164 and an error processor 48C. When one of the entry lines of memory 152 is accessed, the physical address PA and the error code EDC3 stored in that entry line are outputted to the output buffer 164. Thereafter, error processor 48C receives the physical address PA and the error code EDC3 from the buffer 164 and processes them to check for possible errors. Specifically, error processor 48C uses the received physical address PA and error code EDC3 to generate a five bit syndrome code $S3_0$–$S3_4$. Processor 48C then determines whether all of the syndrome code bits are zero. If any syndrome code bit is non-zero, then the physical address PA contains an error. Processor 48C indicates that an error has occurred by generating an error signal on line 166.

To generate the syndrome code bits $S3_0$–$S3_4$, the following logic equations are used:

$S3_0$= $EDC3_0$ ^ PA0 ^ PA3 ^ PA5 ^ PA6 ^ PA9
^ PA10 ^ PA11 ^ PA12 ^ PA13 ^ PA17 ^ PA18
^ PA20 ^ PA21 ^ PA22 ^ PA24;

$S3_1$= $EDC3_1$ ^ PA1 ^ PA4 ^ PA6 ^ PA7 ^ PA10
^ PA11 ^ PA12 ^ PA13 ^ PA14 ^ PA18 ^ PA19
^ PA21 ^ PA22 ^ PA23 ^ PA25;

$S3_2$= $EDC3_2$ ^ PA0 ^ PA2 ^ PA3 ^ PA6 ^ PA7
^ PA8 ^ PA9 ^ PA10 ^ PA14 ^ PA15 ^ PA17
^ PA18 ^ PA19 ^ PA21 ^ PA23;

$S3_3$= $EDC3_3$ ^ PA1 ^ PA3 ^ PA4 ^ PA7 ^ PA8
^ PA9 ^ PA10 ^ PA11 ^ PA15 ^ PA16 ^ PA18 ^ PA19
^ PA20 ^ PA22 ^ PA24; and $S3_4$= $EDC3_4$ ^ PA2 ^ PA4 ^ PA5 ^ PA8 ^ PA9
^ PA10 ^ PA11 ^ PA12 ^ PA16 ^ PA17 ^ PA19 ^ PA20
^ PA21 ^ PA23 ^ PA25;

where ^ denotes an XOR operation.

Figures 10, 11, 12:
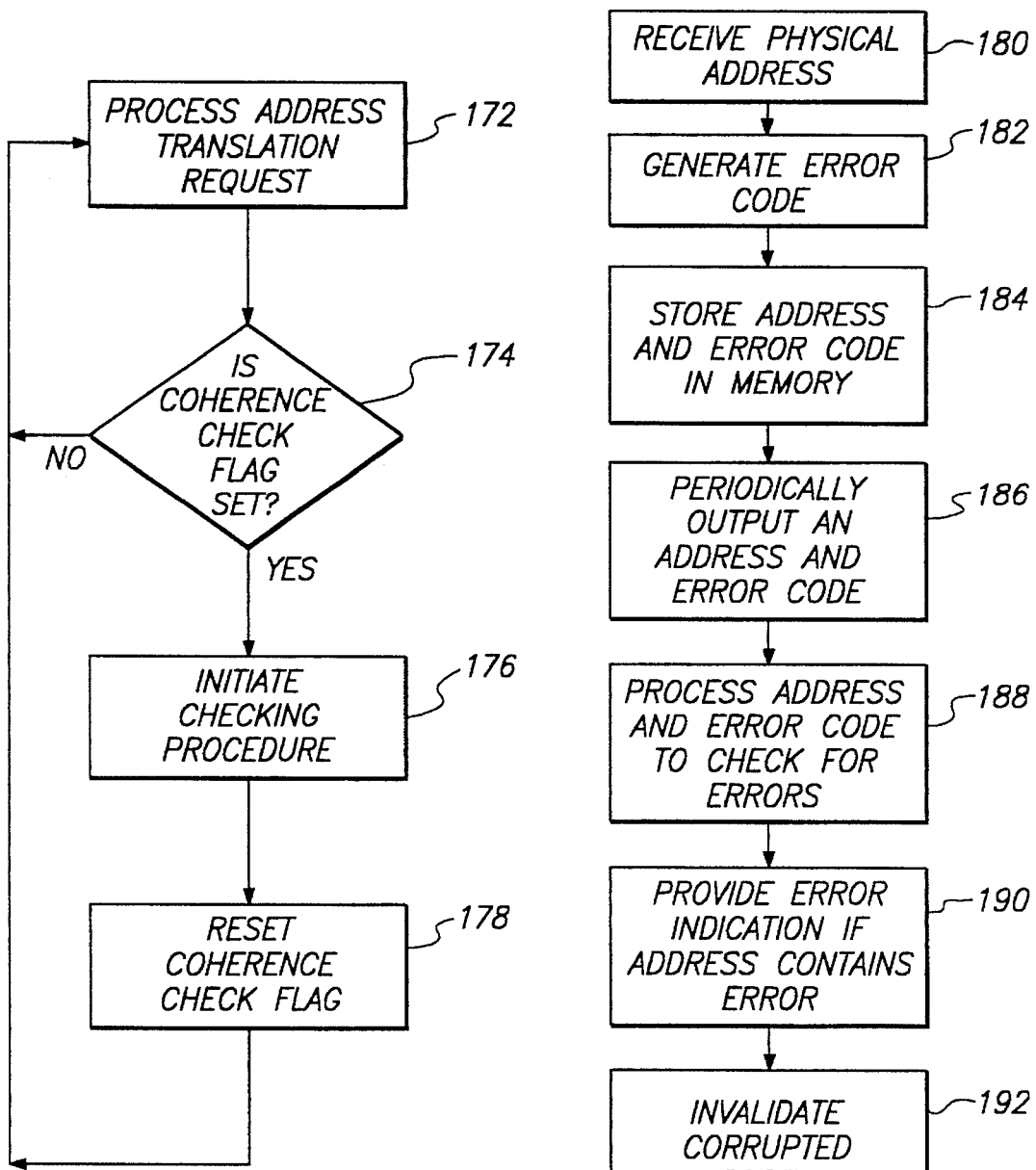
FIG. 10 shows a circuit for performing an OR operation on the five bits $S3_0-S3_4$ of syndrome code S3.
FIG. 11 is a flow diagram for the controller shown in FIG. 8.
FIG. 12 is a flow diagram of the method of the present invention for detecting and handling transient errors occurring within the coherence table 150 of FIG. 9.

As was the case with the previously described syndrome codes, the equations used to generate the syndrome code bits $S3_0$–$S3_4$ are very similar to the equations used to generate the associated error code bits $EDC3_1$–$EDC3_4$. In fact, the only difference between the error code and syndrome code equations is that each syndrome code equation requires one more input than its corresponding error code equation. For instance, the only difference between the equation for $S3_0$ and the equation for $EDC3_0$ is that the equation for $S3_0$ requires one additional input, namely, $EDC3_0$. All other inputs are the same. The practical consequence of this similarity is that the circuit used to generate $EDC3_0$ may be reused to generate $S3_0$. The only necessary modification is the addition of one XOR gate to take the additional input into account. The same is true for the rest of the syndrome code bits. Thus, the syndrome code bits $S3_0$–$S3_4$ may be generated by reusing and modifying the circuits used to generate the error code bits $EDC3_1$–$EDC3_4$. After the syndrome code bits $S3_0$–$S3_4$ are generated, they are applied to the inputs of a five input OR gate 168 as shown in FIG. 10. If any of the bits $S3_0$–$S3_4$ are non-zero, OR gate 168 generates an error signal on line 166 to indicate that the physical address tested contains an error.

Unlike the other memories 80, 82 in the system 24, memory 152 is not accessed in response to a match of an input address. Instead, the access and testing of the contents of memory 152 are controlled by controller 154. A flow diagram for controller 154 is provided in FIG. 11. In normal operation, controller 154 allows the system 24 to receive and process 172 address translation requests from the CPU 12. This includes receiving the input address, matching it with an address in memory 40, outputting the matched address and the associated data, and checking the outputted address and data for errors. After an address translation request is processed, controller 154 checks 174 the status of a coherence check flag. If the flag is set, then controller 154 initiates 176 the process of checking an entry line in the coherence table 150. Otherwise, controller 154 loops back to step 172 to process the next request. The setting of the coherence check flag is controlled by the n-bit programmable counter 180, which may be programmed with any arbitrary number n. The function of the counter 180 is to count $2^n$ clock cycles and to set the coherence check flag at the end of that time. After $2^n$ clock cycles, counter 180 resets and begins its count again. Thus, the counter 180 sets the coherence check flag periodically, with the period being determined by the number n. Since n is programmable, the period may be specifically adjusted to fit the needs of the system 24.

When controller 154 detects that the coherence check flag is set, it initiates 176 the checking of the coherence table 150 by causing one of the entry lines in memory 152 to be accessed. Which entry line is accessed is determined by the contents of the index counter 182. Index counter 182 contains a number which acts as a pointer to point to one of the entry lines in memory 152. The entry line pointed to by counter 182 is accessed and the physical address and corresponding error code stored on that entry line are outputted to output buffer 164. Preferably, each time the coherence table 150 is checked, counter 182 is incremented by one.

After the physical address and error code are stored in output buffer 164, error processor 48C receives and processes the physical address and error code to determine whether the physical address contains an error. If so, an error signal is generated on line 166. The MMU control 28 detects this error signal and responds by accessing memory 80 to reset the appropriate valid bit to invalidate that entry line. Thus, the error in coherence table 150 is detected and properly handled. After one entry in the coherence table is checked for errors, the controller 154 resets 178 the coherence check flag and loops back to process another address translation request. Thus, only one entry in the coherence table is checked for each setting of the coherence check flag. This implementation is advantageous because it minimizes the burden imposed by the error checking on the overall system 24. Other implementations, such as checking two entries for every setting of the flag, may be used if so desired. The controller 154 of the present invention may be implemented in a variety of ways using either hardware or software. In the preferred embodiment, controller 154 is a state machine designed to follow the steps shown in FIG. 11.

With reference to FIG. 9 and the flow diagram provided in FIG. 12, the method of the present invention for checking the coherence table 150 for errors will now be described. The first step in the method is for the code generator 30C to receive 180 a physical address on lines 160. This address is provided by the miss walker at the same time the virtual address, associated data, and the valid bit are provided. This physical address is used by the code generator 30C to generate 182 an error detection code EDC3. Preferably, code generator 30C uses the logic equations previously provided to generate 182 a Hamming error detection code having a Hamming distance of three. After the error code is generated, the error code and the corresponding physical address are stored 184 in an entry line of the memory 152, and there they remain awaiting access. Preferably, steps 180, 182, and 184 are repeated so that a plurality of physical addresses and corresponding error codes are loaded into the entry lines of memory 152.

Since the information stored within memory 152 may be corrupted by transient errors, the stored information needs to be checked for errors to ensure data accuracy. To check for errors, each entry line in memory 152 is periodically accessed to cause the physical address and corresponding error code stored in that entry line to be outputted 186. The periodic accessing of the entry lines of memory 152 is controlled by controller 154 as described above. The error processor 48C receives the outputted address and error code and processes 188 them to determine whether the outputted address contains an error. Preferably, processor 48C carries out this processing step 188 by using the outputted address and error code to generate a syndrome code and then determining whether the syndrome code has a non-zero value as described above. If the syndrome code is non-zero, processor 48C generates an error signal 166 to provide an indication 190 that the outputted address contains an error. In response to this error signal, the MMU control 28 resets the valid bit associated with the entry line which contains the error. This in effect invalidates 192 the entry line containing the error so that that entry is not used in the future. In this manner, errors in the coherence table 150 are detected and properly handled.

What is claimed is:

1. In a system comprising a memory for storing reference information, and a buffer for storing at least a subset of the reference information, a method for detecting and handling errors in the buffer, comprising the steps of:

receiving an input address from a requesting device;

comparing said input address to at least one address stored in the buffer;

if an address in the buffer matches said input address, outputting from the buffer a set of data associated with the matched address, and a corresponding pregenerated error code;

processing said data and said error code to determine whether said data contains an error;

if said data contains an error:
      retrieving, using said input address as an index, a set of reference data from the memory; and
      providing said reference data, instead of the data from the buffer, as output data.

2. The method of claim 1, wherein the step of processing comprises the steps of:

generating a syndrome code using said data and said error code; and determining whether said syndrome code has a value of zero.

3. In a system comprising a memory for storing reference information, and a buffer for storing at least a subset of the reference information, a method for detecting and handling errors in the buffer, comprising the steps of:

receiving an input address from a requesting device;

comparing said input address to at least one address stored in the buffer;

if an address in the buffer matches said input address, outputting from the buffer the matched address, a set of data corresponding to said matched address, and a corresponding pregenerated error code;

processing said matched address and said error code to determine whether said matched address contains an error;

if said matched address contains an error:
      retrieving, using said input address as an index, a set of reference data from the memory; and
      providing said reference data, instead of the data from the buffer, as output data.

4. The method of claim 3, wherein the step of processing comprises the steps of:

generating a syndrome code using said matched address and said error code; and determining whether said syndrome code has a value of zero.

5. In a system comprising a memory for storing reference information, and a buffer for storing at least a subset of the reference information, a method for detecting and handling errors in the buffer, comprising the steps of:

receiving, from the memory, at least one address and a set of reference data associated with said address;

generating a corresponding error code using said reference data;

storing said address, said reference data, and said error code in the buffer;

receiving an input address from a requesting device;

comparing said input address to the address stored in the buffer;

if said input address matches the address stored in the buffer, outputting from the buffer the data and the error code stored in the buffer;

processing the data and the error code from the buffer to determine whether the data from the buffer contains an error;

if the data from the buffer contains an error:
retrieving, using said input address as an index, said reference data from the memory; and
providing said reference data, instead of the data from the buffer, as output data.

6. The method of claim 5, wherein the step of processing comprises the steps of:

generating a syndrome code using the data and the error code from the buffer; and determining whether said syndrome code has a value of zero.

7. In a system comprising a memory for storing reference information, and a buffer for storing at least a subset of the reference information, a method for detecting and handling errors in the buffer, comprising the steps of:

receiving, from the memory, at least one address and a set of reference data associated with said address;

generating a corresponding error code using said address;

storing said address, said reference data, and said error code in the buffer;

receiving an input address from a requesting device;

comparing said input address to the address stored in the buffer;

if said input address matches the address stored in the buffer, outputting from the buffer the address, the data, and the error code stored in the buffer;

processing the address and the error code from the buffer to determine whether the address from the buffer contains an error;

if the address from the buffer contains an error:
retrieving, using said input address as an index, said reference data from the memory; and
providing said reference data, instead of the data from the buffer, as output data.

8. The method of claim 7, wherein the step of processing comprises the steps of:

generating a syndrome code using the address and the error code from the buffer; and determining whether said syndrome code has a value of zero.

9. A fault tolerant memory system, comprising:

a memory for storing reference information therein, said reference information including a plurality of sets of reference data, at least one of said sets of reference data having an address corresponding thereto;

a buffer for storing at least a subset of said reference information, including at least one address and a set of data associated with said address, said buffer further storing an error code corresponding to the set of data, said buffer further comprising comparing means for receiving an input address from a requesting device and comparing said input address to the address stored in said buffer, said comparing means causing said buffer to output the data and the error code stored in said buffer in response to a determination that said input address matches the address stored in said buffer;

an error processor coupled to said buffer for receiving and processing the data and the error code from said buffer to determine whether the data from said buffer contains an error, said error processor outputting an error signal if the data from said buffer contains an error; and an error handler coupled to said error processor for receiving said error signal, said error handler responding to said error signal by retrieving from said memory a set of reference data corresponding to said input address, and providing this set of reference data as output data.

10. The system of claim 9, wherein said buffer comprises:

a first portion for storing said address, and for receiving and comparing said input address with said address, said first portion outputting a control signal when said input address matches said address; and a second portion separate from said first portion for storing said data and said error code, said second portion coupled to receive said control signal and responding to said control signal by outputting said data and said error code.

11. The system of claim 10 wherein said first portion is a content addressable memory (CAM).

12. The system of claim 11, wherein said second portion is a random access memory (RAM).

13. The system of claim 9, further comprising:

an error code generator for generating said error code using said data, said error code generator coupled to said buffer to transfer said error code to said buffer.

14. The system of claim 13, wherein said error code is an error detection code which can be used to detect up to two bits of error.

15. The system of claim 13, wherein said error code is a hamming error detection code having a hamming distance of three.

16. The system of claim 9, further comprising:

a second buffer for storing a second address and a second corresponding error code;

a controller for periodically causing said second buffer to output said second address and said second error code; and a second error processor coupled to said second buffer for receiving and processing said second address and said second error code to determine whether said second address contains an error, and if so, outputting a second error signal.

17. The system of claim 16, further comprising:

an error code generator for generating said second error code using said second address, said error code generator coupled to said second buffer to transfer said second error code to said second buffer.

18. A fault tolerant memory system, comprising:
- a memory for storing reference information therein, said reference information including a plurality of sets of reference data, at least one of said sets of reference data having an address corresponding thereto;
- a buffer for storing at least a subset of said reference information, including at least one address and a set of data associated with said address, said buffer further storing an error code corresponding to the address, said buffer further comprising comparing means for receiving an input address from a requesting device and comparing said input address to the address stored in said buffer, said comparing means causing said buffer to output the address, the data, and the error code stored in said buffer in response to a determination that said input address matches the address stored in said buffer;
- an error processor coupled to said buffer for receiving and processing the address and the error code from said buffer to determine whether the address from said buffer contains an error, said error processor outputting an error signal if the address from said buffer contains an error; and
- an error handler coupled to said error processor for receiving said error signal, said error handler responding to said error signal by retrieving from said memory a set of reference data corresponding to said input address, and providing this set of reference data as output data.

19. The system of claim 18, wherein said buffer comprises:
- a first portion for storing said address, and for receiving and comparing said input address with said address, said first memory portion outputting said address and a control signal when said input address matches said address; and
- a second portion separate from said first portion for storing said data and said error code, said second portion coupled to receive said control signal and responding to said control signal by outputting said data and said error code.

20. The system of claim 19 wherein said first portion is a content addressable memory (CAM).

21. The system of claim 20, wherein said second portion is a random access memory (RAM).

22. The system of claim 18, further comprising:
- an error code generator for generating said error code using said address, said error code generator coupled to said to transfer said error code to said buffer.

23. The system of claim 22, wherein said error code is an error detection code which can be used to detect up to two bits of error.

24. The system of claim 22, wherein said error code is a hamming error detection code having a hamming distance of three.

25. The system of claim 18, further comprising:
- a second buffer for storing a second address and a second corresponding error code;
- a controller for periodically causing said second buffer to output said second address and said second error code; and
- a second error processor coupled to said second buffer for receiving and processing said second address and said second error code to determine whether said second address contains an error, and if so, outputting a second error signal.

26. The system of claim 25, further comprising:
- an error code generator for generating said second error code using said second address, said error code generator coupled to said second buffer to transfer said second error code to said second buffer.

* * * * *